(12) United States Patent
Brock et al.

(10) Patent No.: US 9,127,227 B2
(45) Date of Patent: *Sep. 8, 2015

(54) METHOD AND APPARATUS FOR PROCESSING BIOMASS MATERIAL

(75) Inventors: J. Donald Brock, Chattanooga, TN (US); Malcolm L. Swanson, Chickamauga, GA (US); Gary L. Catlett, Hixson, TN (US); Jeffrey Blake Pruett, Chattanooga, TN (US)

(73) Assignee: ASTEC, INC., Chattanooga, TN (US)

(*) Notice: Subject to any disclaimer, the term of this patent is extended or adjusted under 35 U.S.C. 154(b) by 239 days.

This patent is subject to a terminal disclaimer.

(21) Appl. No.: 13/616,184

(22) Filed: Sep. 14, 2012

(65) Prior Publication Data
US 2013/0067806 A1    Mar. 21, 2013

Related U.S. Application Data

(60) Provisional application No. 61/627,057, filed on Sep. 16, 2011, provisional application No. 61/626,980, filed on Oct. 6, 2011, provisional application No. 61/634,554, filed on Mar. 2, 2012.

(51) Int. Cl.
*C10L 5/44* (2006.01)
*C10L 5/36* (2006.01)

(52) U.S. Cl.
CPC . *C10L 5/363* (2013.01); *C10L 5/44* (2013.01); *Y02E 50/10* (2013.01); *Y02E 50/15* (2013.01); *Y02E 50/30* (2013.01)

(58) Field of Classification Search
CPC .......... C10L 5/44; C10L 5/442; C10L 5/445; C10L 5/447; C10L 2290/00; C10L 2290/06; C10L 2290/08; C10L 2290/30
USPC .................. 44/589, 629, 635, 636
See application file for complete search history.

(56) References Cited

U.S. PATENT DOCUMENTS

| | | |
|---|---|---|
| 3,177,932 A | 4/1965 | Smith |
| 3,553,849 A | 1/1971 | Carrier et al. |
| 3,777,810 A | 12/1973 | Phillips |
| 3,800,865 A | 4/1974 | Onarheim et al. |
| 3,822,651 A | 7/1974 | Harris et al. |
| 3,958,623 A | 5/1976 | Vissers et al. |

(Continued)

OTHER PUBLICATIONS

International Search Report and Written Opinion of International Searching Authority for Corresponding PCT Application, (Sep. 14, 2012).

(Continued)

*Primary Examiner* — Ellen McAvoy
(74) *Attorney, Agent, or Firm* — Chambliss, Bahner & Stophel, P.C.

(57) ABSTRACT

An assembly for processing green biomass material for pelletizing into a fuel pellet includes a heating assembly, a drying assembly and a cooling assembly. The heating assembly heats a thermal fluid to a temperature within the range of 200° F. to 550° F. The drying assembly includes a rotating dryer drum that has a plurality of thermal fluid tubes therein. Material that is dried in the dryer drum is conveyed to a rotating cooling drum that has a cooling tube extending along the interior thereof. A nozzle is mounted on the end of the cooling tube to discharge cooling fluid on the material therein, and a plurality of flights are mounted on the interior of the cooling drum and arranged to direct material from the inlet to the discharge outlet as the cooling drum is rotated.

7 Claims, 20 Drawing Sheets

(56) References Cited

U.S. PATENT DOCUMENTS

| | | | |
|---|---|---|---|
| 4,074,751 A | 2/1978 | Ducasse | |
| 4,301,860 A | 11/1981 | Pozzi | |
| 4,353,413 A | 10/1982 | Allen et al. | |
| 4,401,436 A | 8/1983 | Bonnecaze | |
| 4,482,253 A | 11/1984 | Golobic et al. | |
| 5,216,821 A | 6/1993 | McCabe et al. | |
| 5,217,578 A | 6/1993 | Taciuk et al. | |
| 5,555,639 A | 9/1996 | Livingston et al. | |
| 6,209,225 B1 | 4/2001 | Villarroel et al. | |
| 6,415,527 B1 | 7/2002 | Rasanen et al. | |
| 7,654,011 B2 | 2/2010 | Ronning et al. | |
| 7,758,235 B1 | 7/2010 | Collette | |
| 7,942,942 B2* | 5/2011 | Paoluccio | 44/605 |
| 8,203,024 B2* | 6/2012 | Leonhardt | 585/240 |
| 8,449,724 B2* | 5/2013 | Stromberg et al. | 202/96 |
| 8,485,457 B2* | 7/2013 | Werner | 241/3 |
| 8,647,586 B2* | 2/2014 | Shulenberger et al. | 422/200 |
| 8,669,404 B2* | 3/2014 | Shulenberger et al. | 585/240 |
| 2003/0192693 A1 | 10/2003 | Wellington | |
| 2003/0221363 A1 | 12/2003 | Reed | |
| 2006/0107587 A1 | 5/2006 | Bullinger et al. | |
| 2007/0266623 A1 | 11/2007 | Paoluccio | |
| 2008/0201980 A1 | 8/2008 | Bullinger et al. | |
| 2008/0229610 A1 | 9/2008 | Ronning | |
| 2009/0056206 A1 | 3/2009 | Gauthier et al. | |
| 2009/0084029 A1 | 4/2009 | Bergman | |
| 2010/0101141 A1 | 4/2010 | Shulenberger et al. | |
| 2010/0124583 A1 | 5/2010 | Medoff | |
| 2010/0162619 A1 | 7/2010 | Peus | |
| 2010/0300368 A1* | 12/2010 | Myers et al. | 119/171 |
| 2011/0179700 A1 | 7/2011 | Monroe et al. | |
| 2011/0252698 A1 | 10/2011 | Camper et al. | |
| 2011/0258914 A1 | 10/2011 | Banasiak et al. | |
| 2011/0265373 A1 | 11/2011 | Thorn et al. | |
| 2011/0297885 A1 | 12/2011 | Boerrigter et al. | |
| 2011/0300269 A1 | 12/2011 | Dale et al. | |
| 2012/0017499 A1 | 1/2012 | Leonhardt | |
| 2012/0110896 A1 | 5/2012 | Coronella et al. | |
| 2012/0117815 A1* | 5/2012 | Wechsler et al. | 34/282 |
| 2012/0159842 A1 | 6/2012 | Teal et al. | |
| 2012/0160658 A1 | 6/2012 | Bartek et al. | |
| 2014/0082998 A1* | 3/2014 | Brock et al. | 44/589 |
| 2014/0109468 A1* | 4/2014 | Dam-Johansen et al. | 44/568 |
| 2014/0115956 A1* | 5/2014 | Dam-Johansen et al. | 44/589 |
| 2014/0123551 A1* | 5/2014 | Wechsler et al. | 44/605 |

OTHER PUBLICATIONS

Robert H. Perry, Perry's Chemical Engineers' Handbook, Sixth Edition, McGraw-Hill Book Company, United States, (1984).

Louisville Dryer Company, web page, (Feb. 10, 2012).

Chris Hopkins, What is Woody Biomass Energy and What Will it Mean to Forestry in North Carolina, NC Cooperative Extension, pp. 1-5.

Mark Jan Prins, Thermodynamic Analysis of Biomass Gasification and Torrefaction, pp. 1-155, (Feb. 16, 2005.)

International Search Report and Written Opinion of International Searching Authority for Corresponding PCT Application, (Oct. 25, 2013).

Brown, "Development of a lab-scale auger reactor for biomass fast pyrolysis and process optimization using response surface methodology." Iowa State University (2009).

Hugo, "Pyrolysis of sugarcane bagasse." Thesis (MScEng (Process Engineering)), University of Stellenbosch (2010).

Boyd, "Mass & Energy Balance for Torrefield Pellett Production." UBC Biomass Pelletization Workshop (May 18, 2011).

Bergman et al., "Torrefaction for biomass co-firing in existing coal-fired power stations ""Biocal." ECN-C-05-013, ECN Biomass (Jul. 2005).

Tumuluru et al., Review on Biomass Torrefaction Process and Product Properties and Design of Moving Bed Torrefaction System Model Development, 2011 ASABE Annual Int'l Meeting.

Peng, "A study of softwood torrefaction and densification for the production of high quality wood pellets", a thesis submitted . . . (Jul. 2012).

* cited by examiner

METHOD AND APPARATUS FOR PROCESSING BIOMASS MATERIAL

CROSS-REFERENCE TO RELATED APPLICATION

This application claims the benefit of U.S. Provisional Patent Application No. 61/627,057 which was filed on Sep. 16, 2011, U.S. Provisional Patent Application No. 61/626,980 which was filed on Oct. 6, 2011, and U.S. Provisional Patent Application No. 61/634,554 which was filed on Jan. 6, 2012.

FIELD OF THE INVENTION

The present invention relates generally to an assembly of components that may be employed to process biomass material for use as fuel or another pellet product. More particularly, the invention relates to an assembly for drying or torrefying biomass for subsequent pelletization.

BACKGROUND OF THE INVENTION

Nature has created a variety of biomass materials with various characteristics. However, all biomass materials are generally comprised of cellulose, hemicellulose and lignin. In particular, the category of biomass generally known as "wood" is comprised of approximately ⅓ by weight cellulose, approximately ⅓ by weight hemicellulose and approximately ⅓ by weight lignin. Because biomass is renewable and sequesters its carbon dioxide emissions, there is great interest in using biomass as a fuel. Biomass fuels are very low in sulfur, but have high moisture content and relatively low heating value per unit of weight, when compared to coal, for example. In order to create an efficient biomass-to-energy conversion, therefore, it is known to dry or to torrefy biomass materials for subsequent densification. Drying of biomass material will generally reduce the moisture content from 30-50% by weight in the green state to about 5-12% by weight, and it will increase the heating value per unit of weight because of fee loss of moisture weight, but it will not impart, significant chemical changes to the biomass material. Further heating under controlled conditions results in torrefaclion, which may be generally described as a pyrolysis or thermal degradation process carried out on wood or other biomass materials at temperatures typically less than about 600° F. in a low-oxygen atmosphere. During torrefaction, the hemicellulose in the biomass is broken down into volatile organic compounds ("VOCs") such as methanol, formaldehyde and acetaldehyde, and at least a portion of these volatile organic compounds are released by evaporation. The removal of hemicellulose increases the energy density or heating value per unit of weight of the biomass; however, full torrefaction without recovery of the evaporated volatile organic compounds results in the loss of the energy stored therein.

A pelletized form of torrefied wood or biomass is highly desirable in that it would allow easy and relatively clean handling and more efficient shipment, especially ocean freight shipment, of a biomass-based fuel. Many attempts have been made to form fuel pellets of torrefied wood and biomass. However, the inventors are not aware of any devices or methods for torrefying or otherwise preparing green biomass to be pelletized that do not require that the processed biomass material be pelletized with an additive, such as lignin, to form a stable pellet.

It would be desirable if a process and apparatus could be developed for making moisture-resistant torrefied fuel pellets from biomass materials without requiring the addition of a binder additive. It would be desirable if such a process and apparatus could be developed for producing a fuel pellet from torrefied biomass that has heating values similar to those of coal, as well as high grindability, structural stability, and moisture resistance. It would also be desirable if the same apparatus could be employed to process biomass materials for use in making white biomass pellets.

ADVANTAGES OF THE INVENTION

Among the advantages of the present invention is that it provides a method and apparatus for making moisture-resistant torrefied fuel pellets from biomass materials without requiring the addition of a binder additive. Another advantage of the invention is that it may be employed to produce a fuel pellet from torrefied biomass that has heating values similar to those of coal, as well as high grindability, structural stability, and moisture resistance. Furthermore, the same apparatus used in processing biomass materials for use in making torrefied pellets may also be employed to process biomass materials for use in malting white biomass pellets.

Other advantages and features of this invention will become apparent from an examination, of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. The steps of all methods described herein can be performed in any suitable order unless otherwise specified herein or clearly indicated by context.

The use of any and all examples or exemplary language (e.g., "such as") herein is intended merely to better illuminate the invention and not to place a limitation on the scope of the invention, unless otherwise indicated by the claims. Nothing in the specification should be construed as indicating any non-claimed element as essential to the practice of the invention.

Several terms are specifically defined herein. These terms are to be given their broadest possible construction consistent with such definitions, as follows:

The terms "biomass" and "biomass materials" refer to plant matter in solid form, including but not limited to grasses, plant stalks, fibers and leaves, bark, wood chips and sawdust.

The term "wood chips" refers to comminuted or particulate material obtained from trees and other woody plants.

The terms "green biomass" and "green biomass materials" refer to biomass materials that have been processed to reduce their particle size.

The terms "pre-dried biomass" and "pre-dried biomass materials" refer to green biomass that has been subjected to a pre-drying treatment to reduce its moisture content.

The term "green wood" refers to green biomass comprising wood chips that have been processed to reduce their particle size to approximately ½ inch or less.

The terms "white biomass" and "white biomass materials" refer to green biomass materials that have been processed to increase their heating value per unit of weight.

The term "white wood" refers to green wood that has been processed to increase its heating value per unit of weight, but not above 8900 BTU/lb.

The terms "torrefied biomass" and "torrefied biomass materials" refer to biomass materials that have been processed to increase their heating value per unit of weight.

The term "lightly torrefied wood" and similar terms refer to biomass comprising wood chips that have been processed to increase their heating value to a level within the range of about 8900 BTU/lb to about 9500 BTU/lb.

The term "fully torrefied wood" and similar terms refer to biomass comprising wood chips that have been processed to increase their heating value to a level within the range of about 9500 BTU/lb to about 12000 BTU/lb.

The term "upper" and similar terms, when used in reference to a relative position or direction on or with respect to an assembly or an item of equipment, or a component or portion thereof, refer to a relative position or direction that is farther away from the ground on which the assembly or item of equipment is placed for operation.

The term "lower" and similar terms, when used in reference to a relative position or direction on or with respect to an assembly or an item of equipment, or a component or portion thereof refer to a relative position or direction that is nearer the ground on which the assembly or item of equipment is placed for operation.

SUMMARY OF THE INVENTION

The invention comprises a method and apparatus for processing green or pre-dried biomass material for pelletizing into a pellet. The apparatus comprises a heating assembly, a drying assembly and a cooling assembly. The heating assembly includes a burner, a heat exchanger having a plurality of heat transfer coils therein and a combustion chamber that is operatively connected between the burner and the heat exchanger. The heating assembly is configured and arranged so that the burner may be operated to heat a thermal fluid in the heat transfer coils to a temperature within the range of 200° F. to 550° F. The drying assembly includes a dryer frame and a generally cylindrical dryer drum. The dryer frame has an upper end and a lower end, and the dryer drum is mounted on the dryer frame for rotation about the axis of the dryer drum. Furthermore, the dryer drum has an upper end with an inlet and a lower end with a discharge outlet. A plurality of thermal fluid tubes extend along the interior of the dryer drum and are in fluid communication with the heat transfer coils of the heat exchanger. The drying assembly includes means for rotating the dryer drum with respect to the dryer frame, and means for conveying the thermal fluid from the heat exchanger of the heating assembly through the thermal fluid tubes in the dryer drum. The cooling assembly includes a generally cylindrical cooling drum that is mounted on a cooler frame for rotation about the axis of the cooling drum. The cooling drum also has an inlet end with, an inlet, an outlet end with a discharge outlet, and a cooling tube extending along the interior of the cooling drum. A nozzle is mounted on the end of the cooling tube within the cooling drum, and a plurality of flights are mounted on the interior of the cooling drum and arranged to direct material from the inlet end to the outlet end as the cooling drum, is rotated. The cooling assembly also includes means for rotating the cooling drum with respect to the cooler frame, and means for conveying cooling fluid through the cooling tube to be discharged through the nozzle. The apparatus also includes means for conveying material from the discharge outlet of the dryer drum to the inlet of the cooling drain and a steam duct for conveying; steam from the upper end of the dryer drum to the combustion chamber. One embodiment of the apparatus includes a VOC duct for conveying volatile organic compounds from the lower end of the dryer drum to the combustion chamber.

In one embodiment of the invention, a recirculation system is provided to recirculate hot, low-oxygen gases from the exhaust of the heat exchanger to the dryer drum in order to lower the humidity ratio within the dryer drum. This recirculation system includes an outlet line from the heat exchanger, a recirculating fan and an inlet line to the dryer drum.

In another embodiment (or in the embodiment that includes the recirculation system described above), a pre-dryer is provided to utilize heat from the exhaust of the heat exchanger to preheat green biomass prior to its introduction into the dryer drum. Once the plant is placed into operation, green biomass can be introduced into the predryer, which comprises an inclined rotating predryer drum. The predryer drum includes an upper end and a lower end, and a rotation system for rotating the predryer drum about its long axis. An inlet, for green biomass material is located at the upper end, as is an inlet line for exhaust gases from the heat exchanger. Hot flue gases from the heat exchanger are directed into the predryer dram so as to flow therethrough parallel to the flow of biomass. The pre-dried-biomass is discharged from the lower end of the predryer drum onto a conveyor that transports it to the dryer drum.

The invention also includes a method for operating the apparatus to make a pellet from green biomass, which includes introducing green or pre-dried biomass into the inlet at the upper end of the dryer drum, and operating the burner to heat thermal fluid in the heat-exchanger to a temperature within the range of 200° F. to 240° F. (or at a higher temperature if the biomass residence time in the dryer drum is reduced) if it is desired to produce white biomass, or operating the burner to heat thermal fluid in the heat exchanger to a temperature within the range of 475° F. to 550° F. if it is desired to produce torrefied biomass. The method includes the steps of conveying heated thermal fluid from the heat exchanger through the thermal fluid tubes in the drum dryer, and rotating the drum dryer at a rate sufficient to convey the green biomass introduced into the inlet thereof to the discharge outlet of the dryer drum as it is heated to a temperature of at least about 200° F. so as to convert the green biomass into white biomass, or rotating the dryer drum at a rate sufficient to convey the green biomass introduced into the inlet thereof to the discharge outlet of the dryer drum as it is heated to a temperature of at least about 475° F. to convert the green biomass into torrefied biomass. According to the method, the white biomass or the torrefied biomass is then conveyed from the discharge outlet of the dryer drum to the inlet of the cooling drum, and cooling fluid is conveyed through the cooling tube of the cooling drum so that it is discharged through the nozzle of the cooling drum onto the white biomass or torrefied biomass therein. The cooling drum is rotated at a rate sufficient to convey the white biomass or torrefied biomass introduced into the inlet thereof to the discharge outlet of the cooling drum as it is cooled to a temperature that is less than about 150° F. The white biomass or the torrefied biomass is then conveyed to the pellet press, and the pellet press is operated to compress the white biomass or the torrefied biomass to produce pellets, such as fuel pellets.

In a preferred embodiment of the method, a predryer is provided for heating green biomass material. This predryer comprises an inclined rotating predryer drum having an upper end, a lower end and a long axis. A conventional rotation system is provided for rotating the predryer drum about its long axis. An inlet chute for green biomass material located at the upper end of the predryer drum, and an outlet for pre-dried biomass is located at the lower end of the predryer drum. A gas inlet line for exhaust gases from the heat exchanger is located at the upper end of the predryer drum, so that hot flue gases from the heat exchanger may be directed into the predryer drum to flow therethrough parallel to the flow of biomass therein. A conveyor is located at the lower end of the predryer drum for transporting pre-dried biomass from the outlet of the predryer drum to the dryer drum, in this embodiment of the invention, the predryer allows the plant to operate while utilizing heat from the exhaust of the heat exchanger to pre-heat green biomass prior to its introduction into the dryer drum, furthermore, when this embodiment of the plant is operated to produce lightly torrefied biomass, much less heat is lost than in a conventional torrefaction process.

In order to facilitate an understanding of the invention, the preferred embodiment of the invention and the best modes known by the inventors for carrying out the invention, are illustrated in the drawings, and a detailed description thereof follows, it is not intended, however, that the invention be limited to the particular embodiments described or to use in connection with the apparatus illustrated herein. Therefore, the scope of the invention contemplated by the inventors includes all equivalents of the subject matter recited in the claims, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements, components and steps of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and wherein.

DESCRIPTION OF THE PREFERRED EMBODIMENTS OF THE INVENTION

Figure 6:
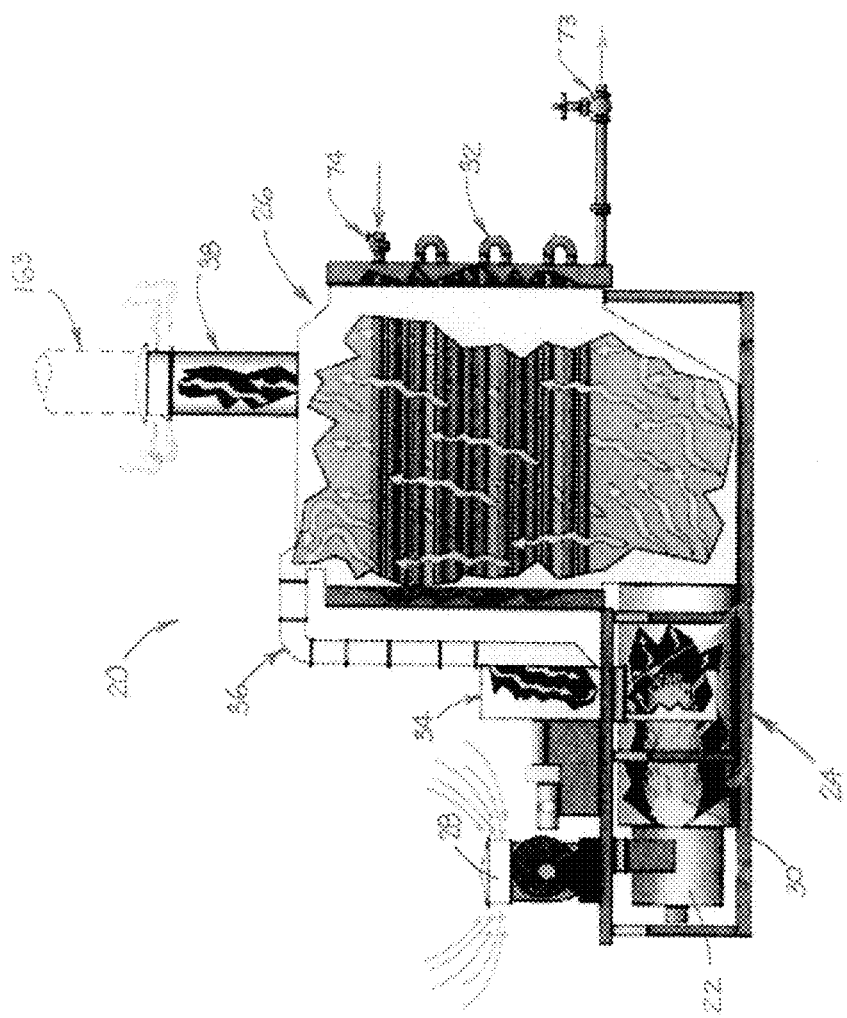
FIG. 6 is a partial sectional view of a first embodiment of the heating assembly of the plant illustrated in FIG. 1.

The drawings illustrate a preferred embodiment of a plant for producing white pellets or torrefied pellets according to the invention. As shown therein, this preferred plant includes heating assembly 21 (see FIGS. 1, 2 and 6) comprising burner 22 that is operatively connected to combustion chamber 24, and heat exchanger 26. Burner 22 is of a conventional type having air inlet 28 and is adapted to burn fuel such as natural gas, propane, pulverized coal, fuel oil or the like. As best shown in FIG. 6, burner 22 produces flame 30 in combustion chamber 24, heating air that passes into heat exchanger 26. Heat exchanger 26 includes a plurality of heat transfer coils 32 therein, which coils are adapted to receive a thermal fluid such as thermal oil. Combustion chamber 24 is operatively connected between the burner and the heat exchanger so that air heated in the combustion chamber by the burner may be conveyed into the heat exchanger, where it will heat the thermal fluid in heat transfer coils 32. Heat exchanger 26 may be equipped with a recirculation fan (not shown) that is mounted in housing 34 and operates to draw heated air from heat exchanger 26 through recirculation duct 36 and into combustion chamber 24 for further heating. Preferably, the heating assembly will be operated to generate up to 40 million or more BTUs per hour to heat the thermal fluid within heat transfer coils 32 to a temperature within the range of 200° F. to 550° F. The preferred heating assembly is the Convectec™ heater that is manufactured and sold by Heatec, Inc. of Chattanooga, Tenn.

In the embodiment of the invention that includes predryer 39 (best shown in FIG. 16, and discussed in more detail hereinafter), hot flue gases generated by the heating assembly are conveyed from exhaust stack 38 to the predryer for use in pre-drying green biomass.

If it is desired to convert green or pre-dried biomass to white biomass, it is preferred that the burner be operated to heat the thermal fluid in the heat exchanger to a temperature of at least 200° F. to 240° F. White biomass can also be created at higher temperatures, if the amount of time that the biomass is exposed to the higher temperatures is less than would be the case for lower temperature operation. If, on the other hand, it is desired to convert green or pre-dried biomass to torrefied biomass, it is preferred that the burner be operated to heat the thermal fluid in the heat exchanger to a temperature within the range of about 475° F. to about 550° F.

One embodiment of the plant also includes drying assembly 40 which includes dryer frame 42 (shown in FIGS. 4 and 7-11) having upper end 44 and lower end 46. Generally cylindrical dryer drum 48 is mounted on dryer frame 42 for rotation about axis 50 (best shown in FIG. 9). Dryer drum 48 includes a pair of outer rings 52 that engage trunnions 54 on dryer frame 42. Motor 56 (shown in FIG. 4) is adapted to rotatably drive a sprocket (not shown, but located in housing 58) that is in driving engagement with drive chain 60 which, engages sprocket 62 mounted on the outer surface of the drum to rotate dryer drum 48 in a conventional manner. Alternative drive systems such as are known to those having ordinary skill in the art to which the invention relates may also be employed to rotate dryer drum 48 with respect to dryer frame 42.

Figure 3:
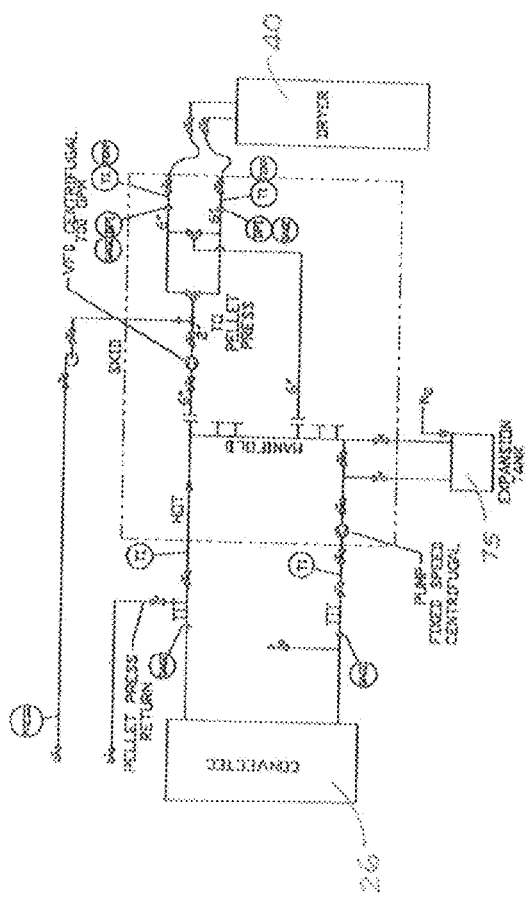
FIG. 3 is a schematic view of the thermal fluid piping for the heating and drying assemblies of the plant illustrated in FIG. 1.
Figure 9:
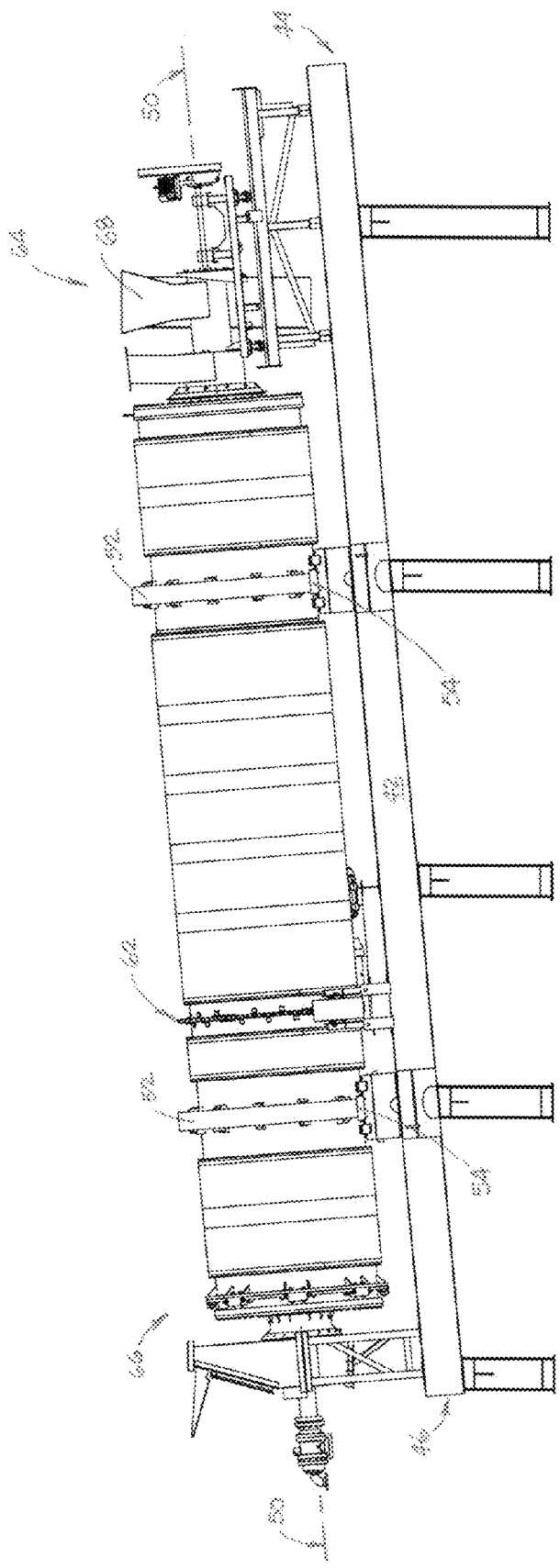
FIG. 9 is a side view of the preferred drying assembly of FIG. 8.
Figure 10:
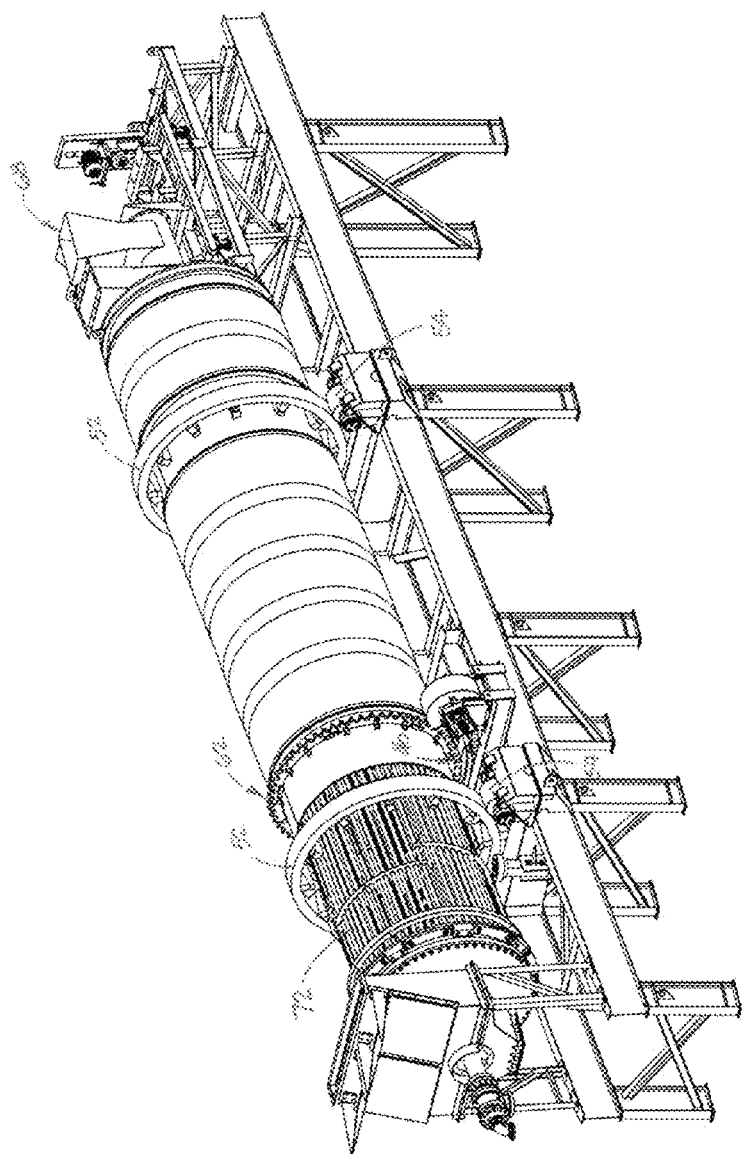
FIG. 10 is a perspective view of the drying assembly of FIGS. 8 and 9, with a portion of the outer housing of the drying drum removed to show the thermal fluid tubes therein.
Figure 11:
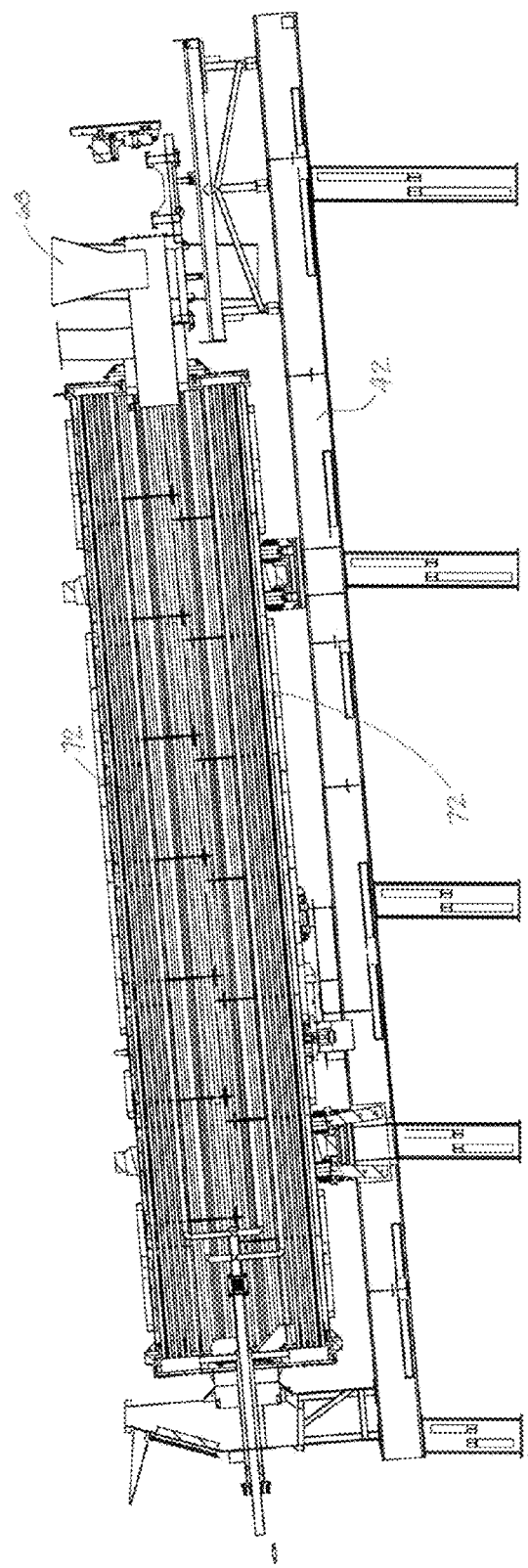
FIG. 11 is a partial sectional view of the drying assembly of FIGS. 8-10, showing the thermal tubes extending along the length of the drying drum.
Figure 12:
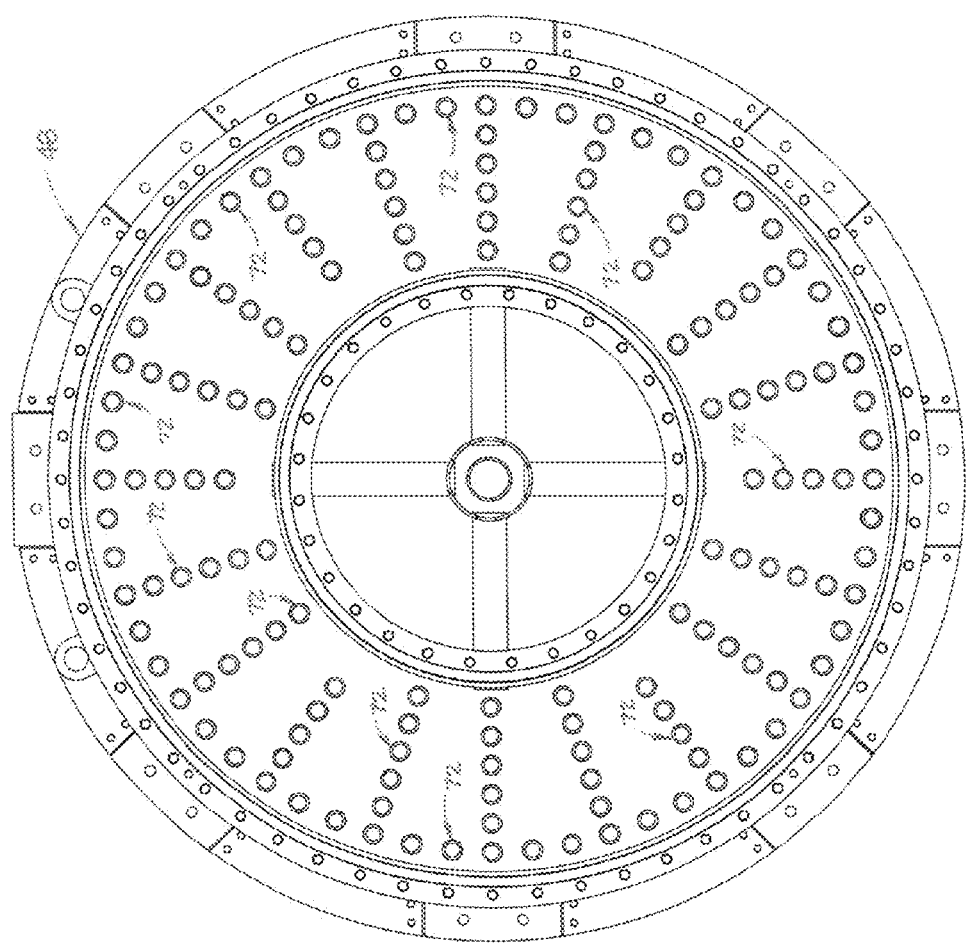
FIG. 12 is an end view of a portion of the drying drum of FIGS. 8-11, showing the arrangement of thermal tubes therein.

Because dryer drum 48 is mounted on frame 42 having upper end 44 and lower end 46, the axis 50 of the drum is oriented downwardly from upper end 64 of dryer drum 48 to lower end 66 of the drum (best shown in FIG. 9). Upper end 64 of dryer drum 48 is provided with inlet 68 for green or pre-dried biomass material, and lower end 66 is provided with a discharge outlet in the form of chute 70 (best shown in FIG. 7). Dryer drum 48 is also provided with a plurality of thermal fluid tubes 72 that extend along the interior of the drum and are adapted to circulate thermal fluid that has been heated by heating assembly 40 through the dryer drum. FIG. 3 illustrates schematically the pumps and fluid lines that are employed to convey thermal fluid from thermal fluid outlet 73 of heat exchanger 26 of heating assembly 21 to and through thermal fluid tubes 72 of dryer drum 48 and back into the heat exchanger through thermal fluid inlet 74 (see FIG. 6). Since axis 50 of dryer drum 48 is tilted with respect to the ground on which frame 42 is placed, rotation of the dryer drum will cause green or pre-dried biomass material introduced into inlet 68 at upper end 64 to tumble and move downwardly towards discharge outlet at lower end 66. As it does so, the biomass material will come into contact with thermal fluid tubes 72 multiple times. Because there may be expansion of the thermal fluid as it is heated, an expansion tank 75 (see FIGS. 1, 3 and 5) and an associated pump is provided to withdraw hot thermal fluid from the assembly through line 76 and return it to the thermal fluid circuit as needed. The rate of rotation of the dryer drum will determine the residence time of biomass therein, and this rate of rotation, along with the thermal fluid temperature in the heat exchanger, may be controlled to process green or pre-dried biomass to create either white biomass or torrefied biomass.

Figure 5:
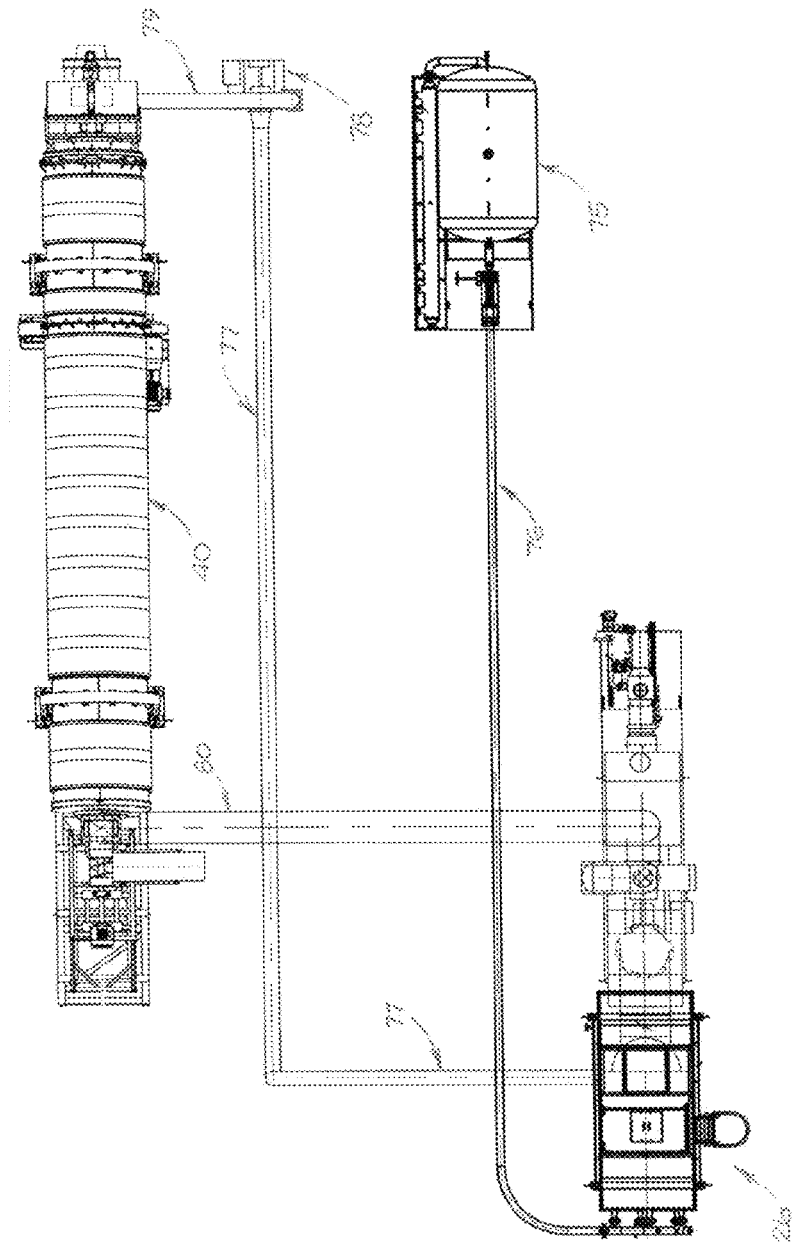
FIG. 5 is a top view, partially in schematic, of a portion of the preferred heating assembly of the plant illustrated in FIG. 1, showing the recirculation system by which a portion of the VOCs from the drying process are used in torrefaction process.

In a preferred embodiment, of the invention, a recirculation system is provided to recirculate hot, low-oxygen gases from exhaust stack 38 of the heat exchanger to the dryer drum in order to lower the humidity within the dryer drum. As shown in FIG. 5, this recirculation system includes outlet line 77 from the heat exchanger, recirculating fan 78 and inlet line 79 (also shown in FIG. 8) to dryer drum 48.

If it is desired to convert green or pre-dried biomass to white biomass in the drying assembly, it is preferred that the burner be operated to heat the thermal fluid in the heat exchanger to a temperature of at least about 200° F., and that the thermal fluid be pumped into and through thermal fluid tubes 72 while the dryer drum is rotated at a rate sufficient to convey the green or pre-dried biomass introduced into the inlet thereof to the discharge outlet of the dryer drum as it is heated to a temperature of at least about 200° F. If, on the other hand, it is desired to convert green or pre-dried biomass to torrefied biomass, it is preferred that the burner be operated to heat the thermal fluid in the combustion chamber to a temperature within the range of 475° F. to 550° F., and that the thermal fluid be pumped into and through thermal fluid tubes 72 while the dryer drum is rotated at a rate sufficient to convey the green or pre-dried biomass introduced into the inlet thereof to the discharge outlet of the dryer drum as it is heated to a temperature of at least about 475° F. It is also contemplated within the scope of the invention that the green or pre-dried biomass can be converted to white biomass by heating it to a temperature of at least about 200° F., and the white biomass can be removed from the drying drum for storage. If it is subsequently desired to convert the white biomass to torrefied biomass, the white biomass may be introduced into the inlet of the dryer drum instead of green or pre-dried biomass. In such case, the thermal fluid should be heated to a temperature within the range of 475° F. to 550° F. while the drum is rotated at a rate sufficient to convey the white biomass to the discharge outlet of the dryer drum as the biomass is heated to a temperature of at least about 475° F. to convert it to torrefied biomass. In one embodiment of the invention that includes predryer 39, the apparatus can be operated so that the biomass is lightly torrefied (as described in more detail hereinafter). This can be accomplished by heating the thermal fluid in the heat exchanger to a temperature in the lower portion of the desired torrefaction range (475° F. to 550° F.), or by limiting the amount of time that the biomass is subjected to torrefaction temperatures as it moves through dryer drum 48, in order to produce a torrefied biomass having a heating value-within the range of about 8900 BTU/lb to about 9500 BTU/lb.

Preferably, thermal tubes 72 have an outer diameter of two inches and a wall thickness of 0.2 inches. Furthermore, they are preferably provided in such number so that they present 50-100 square feet of surface area per foot of length of the dryer drum. In one embodiment of the invention, dryer drum 48 is of such length that the plurality of thermal fluid tubes 72 extending along the interior thereof present 2500-3500 square feet of heated surface area for contact with the tumbling biomass material, although other embodiments of the invention may have more or less total tube surface area. One embodiment of the invention may comprise a dryer drum, that is 40 feet in length which is equipped with 160 thermal tubes having an outer diameter of two inches. Such a dryer drum may have about 3000 square feet of heated surface area that is provided by the thermal tubes. Preferably, the dryer drum is of sufficient size and capacity, and is adapted to be rotated at a rate that will provide at least about 20 minutes of residence time for biomass material therein.

Figure 13:
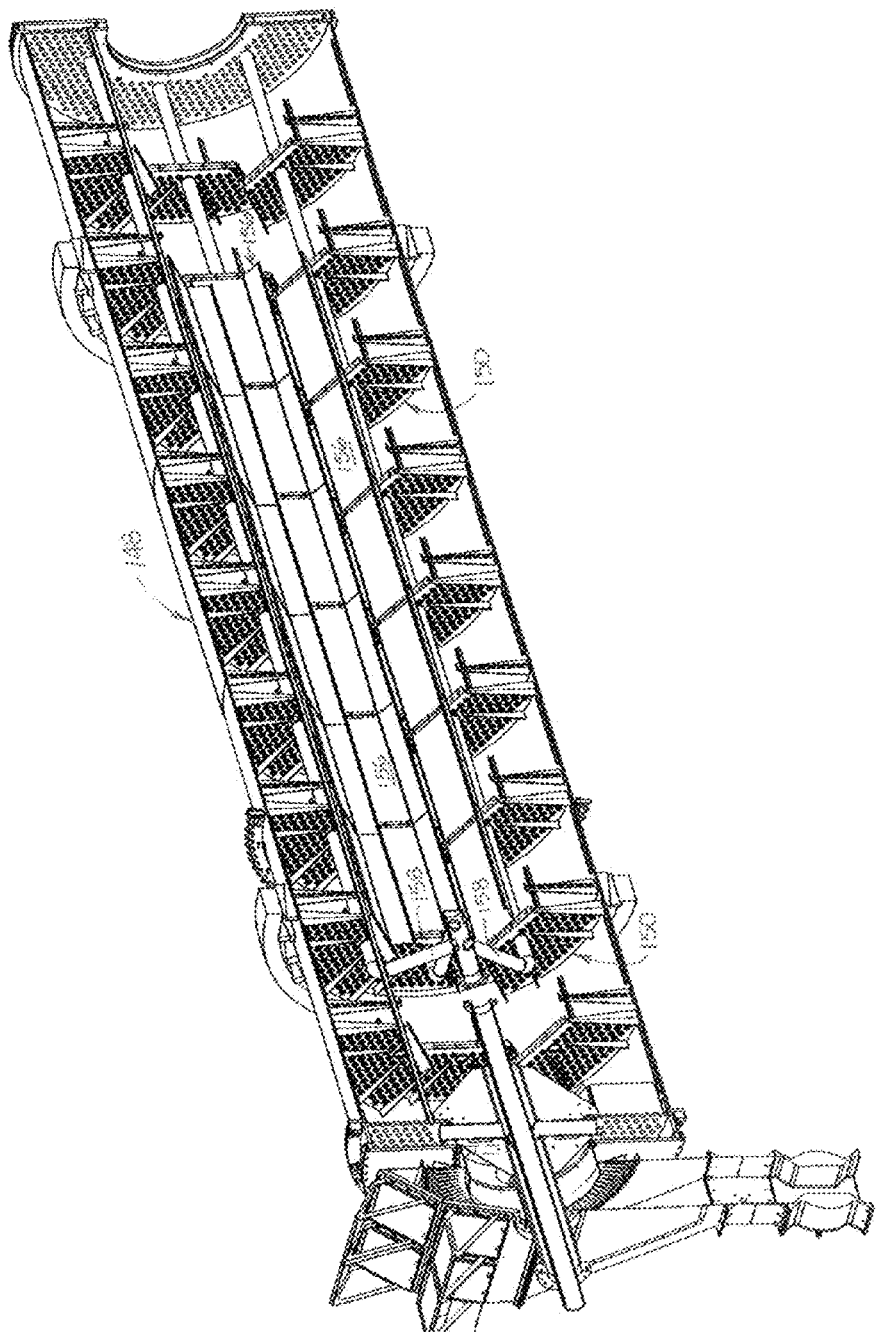
FIG. 13 is a partial sectional view of an alternative embodiment of the drying drum that may be employed in the plant illustrated in FIG. 1.
Figure 14:
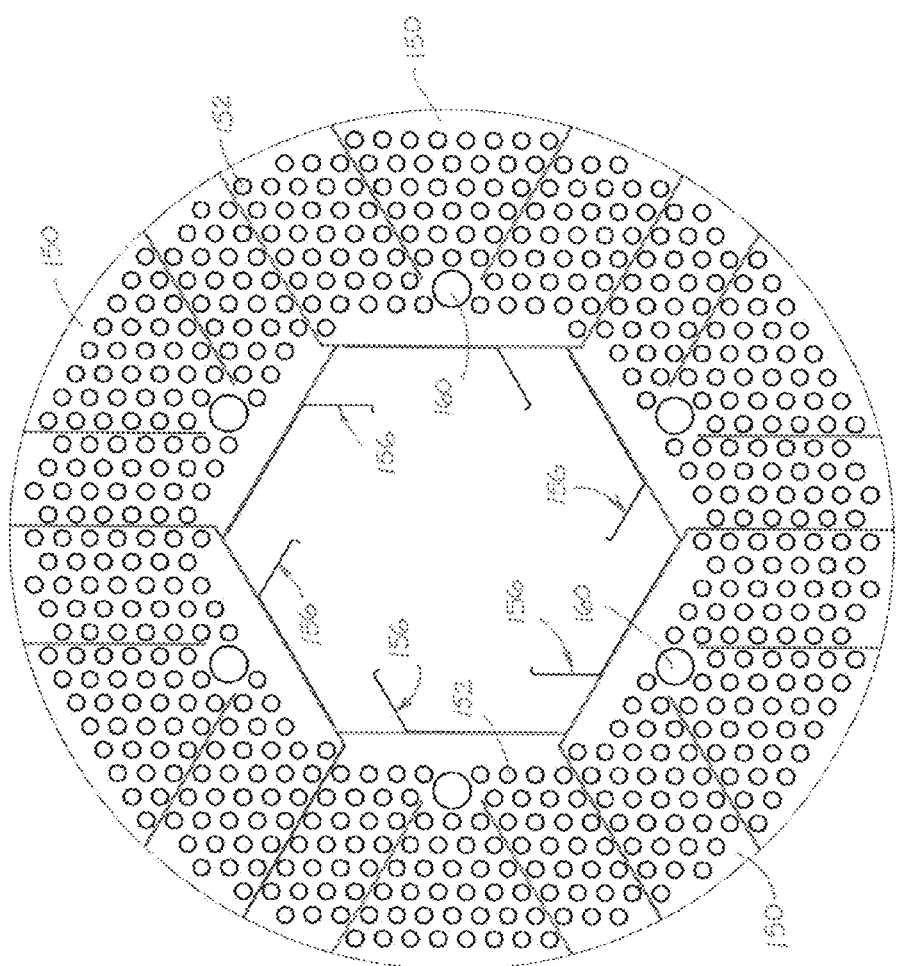
FIG. 14 is an end view of a portion of the drying drum of FIG. 13, showing the arrangement of thermal tubes and internal flights therein.
Figure 15:
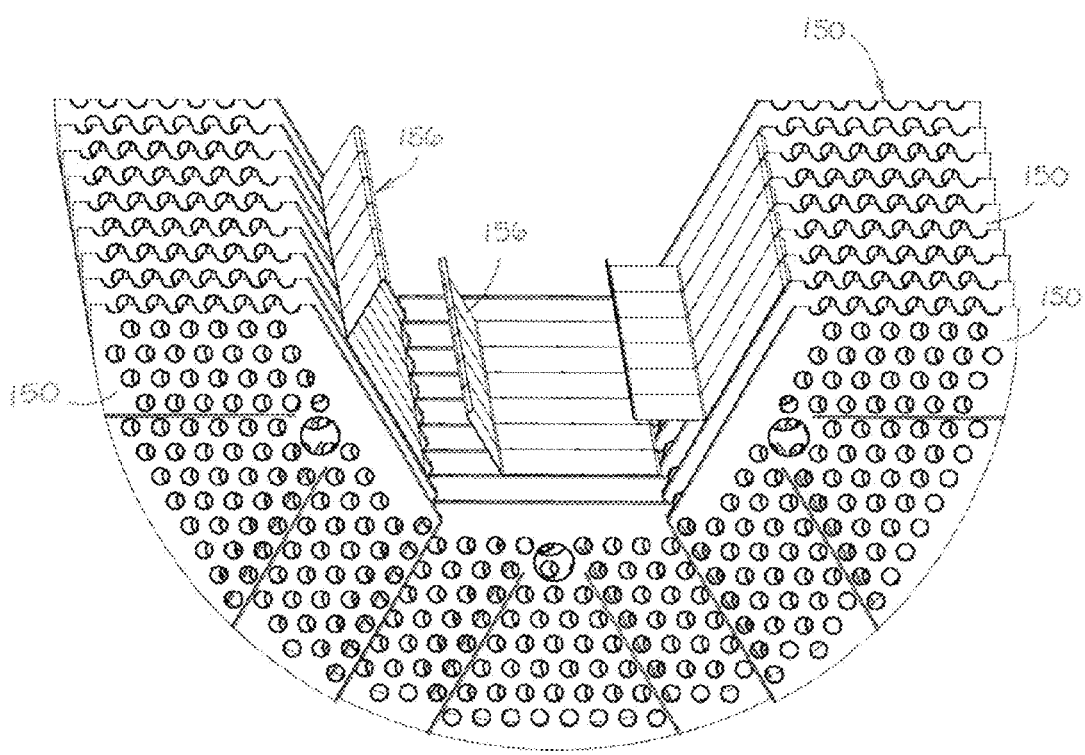
FIG. 15 is a partial perspective view of a portion of the drying drum of FIG. 13, showing the tube support plates and the internal flights of this embodiment.

Another embodiment of the dryer drum is illustrated in FIGS. 13-15. As shown therein, dryer drum 148 is essentially identical to dryer drum 48, except that the thermal fluid tubes (not shown, but essentially identical to thermal fluid tubes 72 of dryer drum 48) are mounted through and supported by a plurality of tube support plates 150 that are spaced along the length of the dryer drum. These support plates include a plurality of tube support, holes 152 that support thermal fluid tubes near the periphery of the dryer drum. Support plates 150 also support a plurality of flights or scoops 156 in the central portion of the dryer drum. These scoops 156 capture biomass material that has spilled, out of the tube bundle into the central portion of the drum, and they direct such material back into contact with the thermal fluid tubes. The thermal fluid tubes are in fluid communication with a thermal fluid manifold 158 that is supported in manifold, support holes 160 in support plates 150, so that, thermal fluid can be circulated through the various fluid tubes of the drying assembly.

As the drying process is carried out, whether to create white biomass or torrefied biomass, steam will be produced as the moisture content of the green biomass is reduced. This steam will displace air in the drying drum until the oxygen content in the atmosphere of the drum is reduced to below about 9%, and more preferably below about 6%. In the drying process to create white biomass or in the torrefaction process, this steam will be contaminated with volatile organic compounds. Consequently, steam duct 80 is provided for conveying steam from upper end 64 of dryer drum 48 to combustion chamber 24 of heating assembly 21. Any volatile organic compounds in the steam that, is conveyed into the combustion chamber will be incinerated in the combustion chamber, thereby adding to the energy available for heating. In addition, the torrefaction process will strip volatile organic compounds from the biomass in drying drum 48. Because those volatile organic compounds are heavier than fee steam and because they are stripped from the biomass in the higher-temperature region of the drum near lower end 66, the embodiment of drying drum 48 illustrated in the drawings includes VOC duct 82 that is mounted to convey these volatile organic compounds to combustion chamber 24. Like the volatile organic compounds in the steam that is conveyed to the combustion chamber by steam duct 80, the volatile organic compounds in VOC duct 82 will be incinerated in the combustion chamber, and will not pass through exhaust stack 38 of heat exchanger 26.

When the palletizing process is separated from the drying and/or torrefaction processes, and the processed biomass is cooled, before being pelletized, the biomass drying process off-gas will be primarily comprised of clean steam, and any torrefaction process off-gas will be comprised of volatile organic compounds. No liquids are produced at all as long as the steam is not allowed to condense.

In one embodiment of the invention, a fuel, control mechanism that is a part of the heating assembly may be operated from control center 84 to control the supply of external fuel to burner 22 at a first rate when the assembly is first placed into operation. Then, as volatile organic compounds are stripped from the biomass in dryer drum 48 during torrefaction and are conveyed to combustion chamber 24, the rate of supply of external fuel to the burner may be reduced to a second rate that, is lower than the first rate. It is contemplated that, depending on the type of biomass introduced into the dryer drum and the temperature of operation and rate of rotation of the dryer drum, the supply of external fuel to the burner may be reduced or shut off and continued heat supplied to the combustion chamber by the incineration of volatile organic compounds therein.

Figure 16:
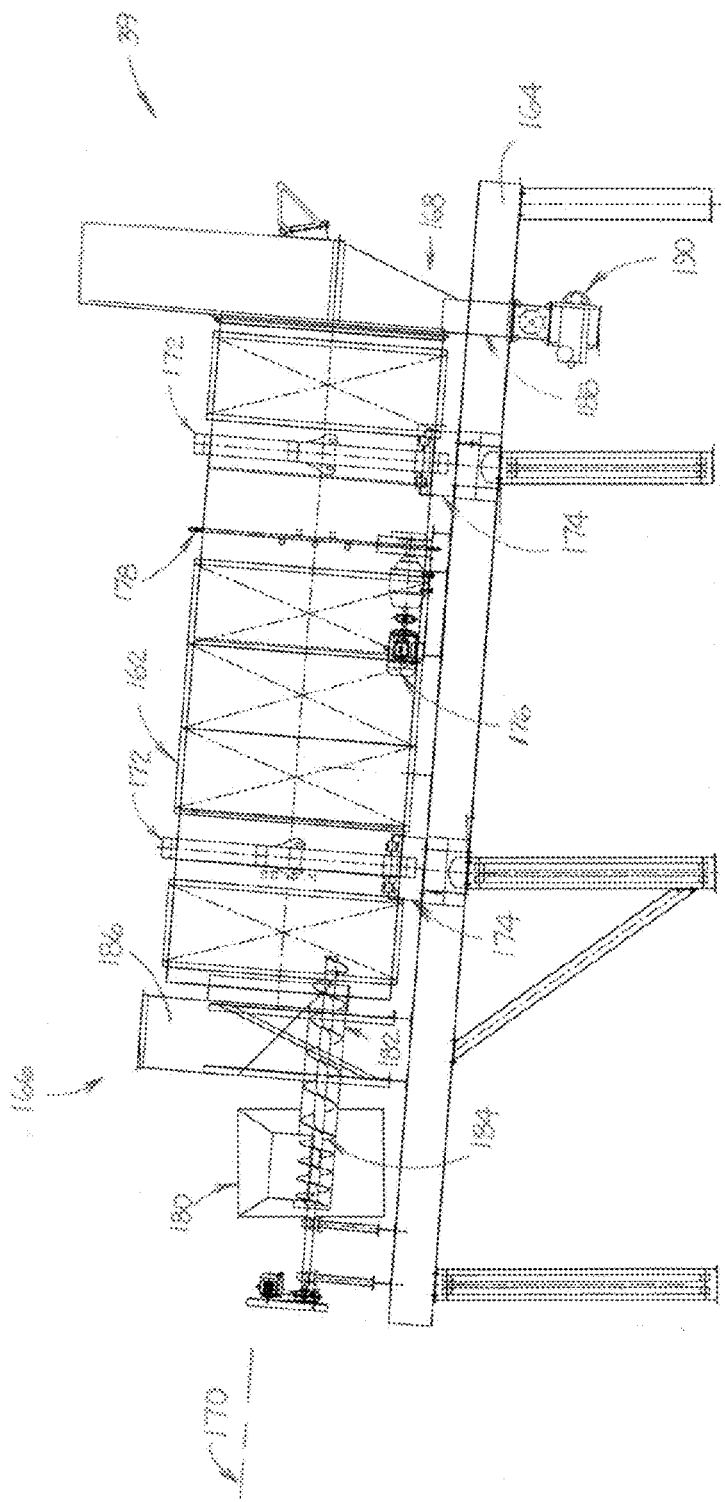
FIG. 16 is a side view, partially in schematic, showing a predryer that may be employed in the plant shown in FIG. 1.

In one embodiment of the invention, predryer 39 is provided to utilize heat from the flue gases passing through exhaust stack 38 of heat exchanger 26 to pre-heat green biomass prior to its introduction into the dryer drum. Once the plant is placed into operation, green biomass can be introduced into the predryer. As shown in FIG. 16, predryer 39 comprises an inclined rotating predryer drum 162. The pre-dryer drum is mounted on frame 164 and includes upper end 166 and lower end 168. A rotation system for rotating the predryer drum about its long axis 170 includes a pair of outer rings 172 that engage trunnions 174 on frame 164. Motor 176 is adapted to rotatably drive a sprocket (not shown, but similar to that of dryer drum 48) that is in driving engagement with a drive chain (also not shown) which engages sprocket 178 mounted on the outer surface of the drum to rotate predryer drum 162 in a conventional manner. Hopper 180 is located at upper end 166 of predryer drum 162 and is in communication with inlet chute 182. The hopper is adapted to receive green biomass from a conventional conveyor (not shown). An auger or screw conveyor 184 is preferably located in inlet chute 182 to convey green biomass material from the hopper into predryer drum 162. Inlet line 186 for exhaust gases from heat exchanger 26 is also located on the upper end 166 of predryer drum 162. During operation of this embodiment of the invention, hot flue gases from the heat exchanger are directed from exhaust stack 38 through pipe 163 (shown in phantom in FIG. 6) and Inlet line 186 into the predryer drum so as to flow therethrough parallel to the flow of biomass. Pre-dried biomass is discharged from the lower end 168 of the predryer drum through outlet chute 188 onto conveyor 190 that transports the pre-dried biomass to dryer drum 48. In this embodiment of the invention, the pre-dried biomass from the outlet chute of the predryer drum is conveyed to inlet 68 of drum dryer 48. The drum dryer may be rotated at a rate sufficient to convey the pre-dried biomass introduced into the inlet of the dryer drum to the discharge outlet of the dryer drum as it is heated to a temperature sufficient to convert the pre-dried biomass into torrefied biomass having a heating value within the range of about 8900 BTU/lb to about 9500 BTU/lb. This light torrefaction process results in the generation of a smaller amount of VOCs in the dryer drum; however, because the predryer captures excess heat from the hot flue gasses produced in heat, exchanger 26 and transfers a portion of this excess heat to the green biomass in the predrying process, the total energy loss from the torrefaction process is reduced from about ⅓ of the energy in the biomass (in the full torrefaction process) to about ⅕ of the energy in the biomass (in the light torrefaction process).

Figure 1:
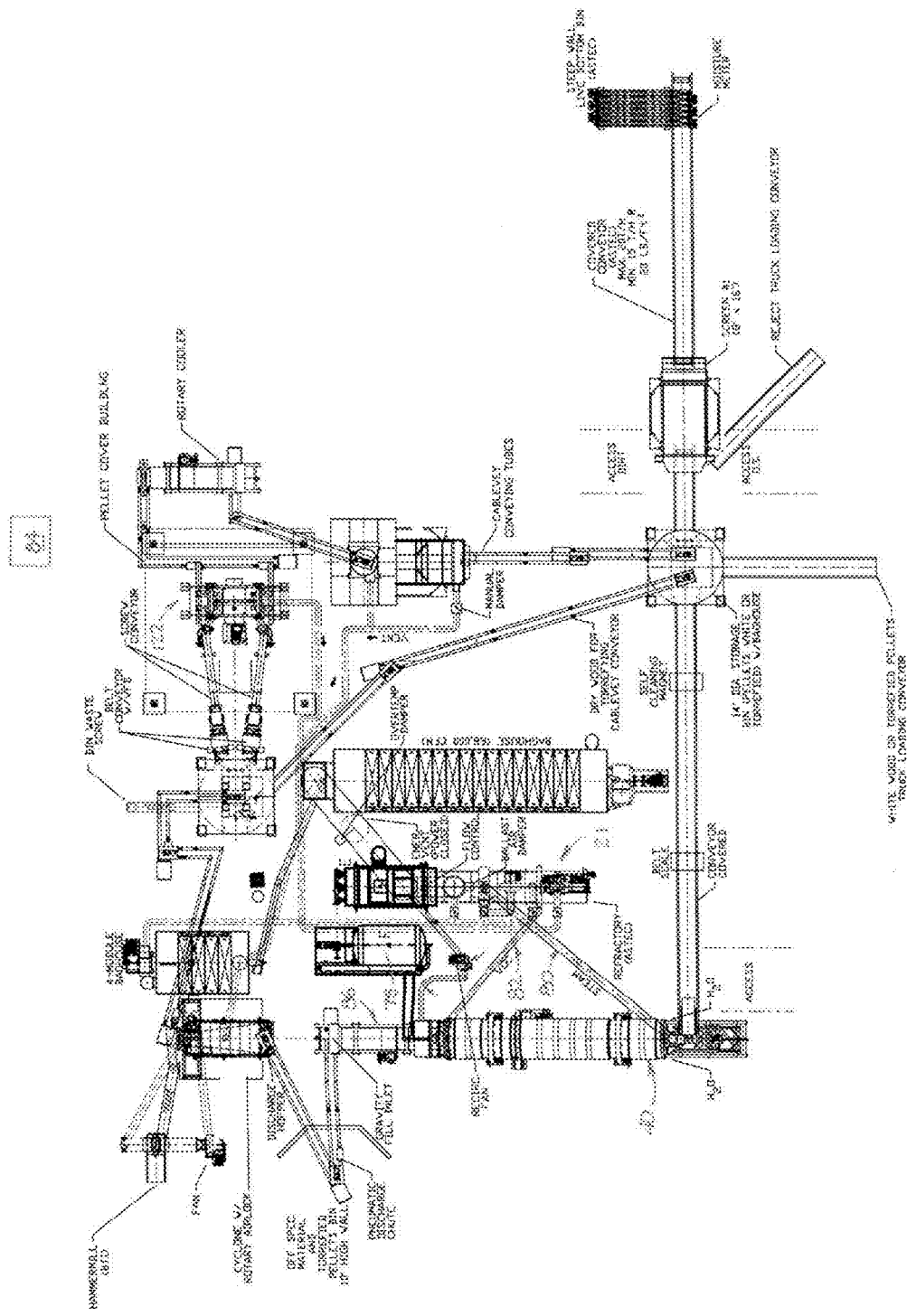
FIG. 1 illustrates the layout for a preferred embodiment of a plant for producing white pellets or torrefied pellets according to a preferred embodiment of the method.
Figure 2:
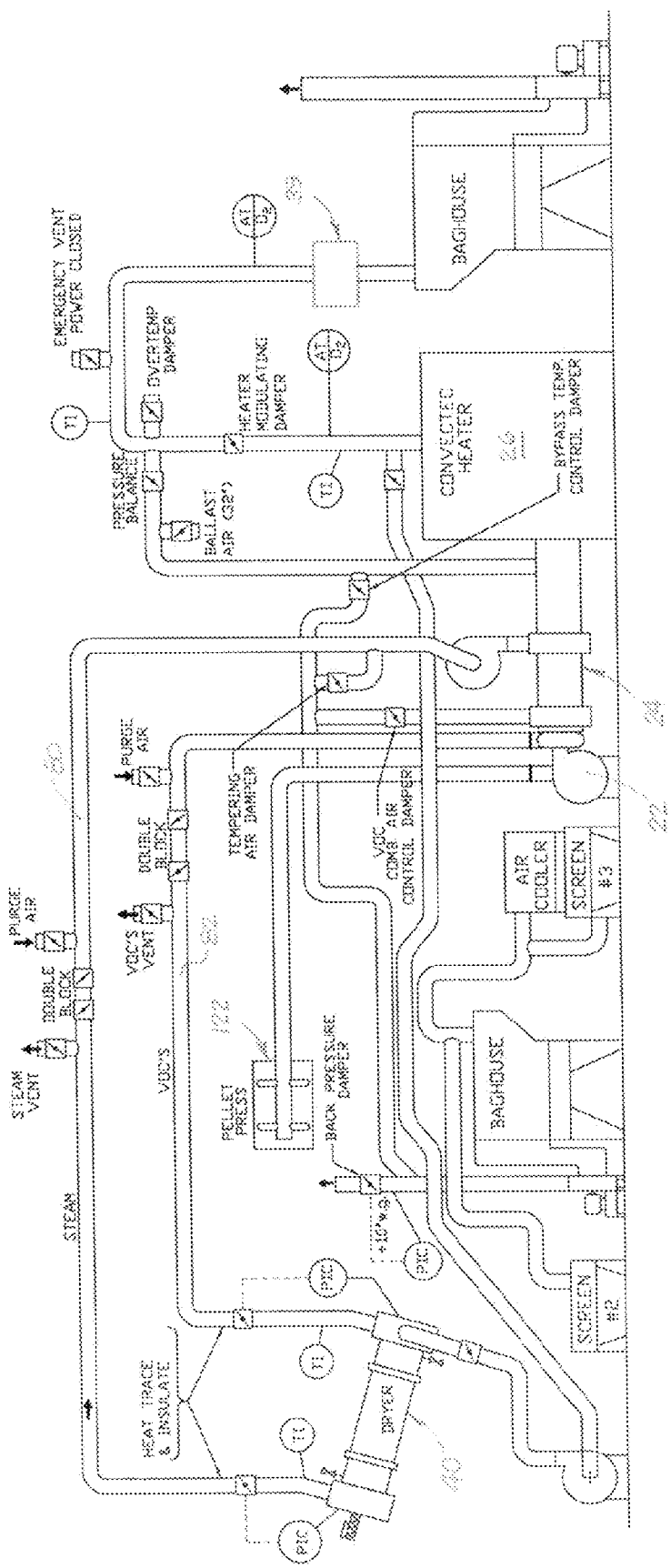
FIG. 2 is a schematic view of the ducting for the heating assembly and the drying assembly of the plant illustrated in FIG. 1.
Figure 4:
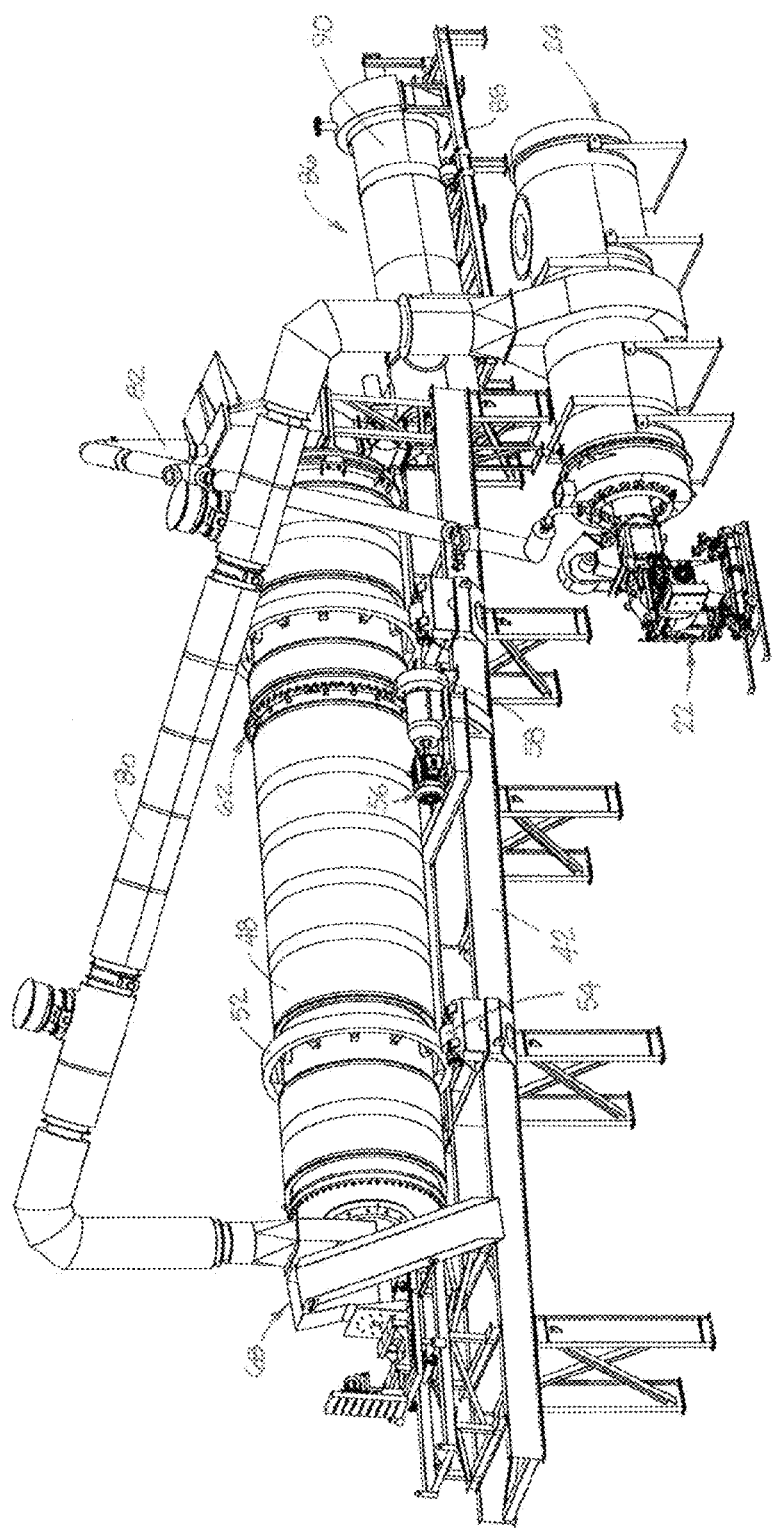
FIG. 4 is a perspective view of the preferred drying and cooling assemblies and a portion of the preferred heating assembly of the plant illustrated in FIG. 1.
Figure 7:
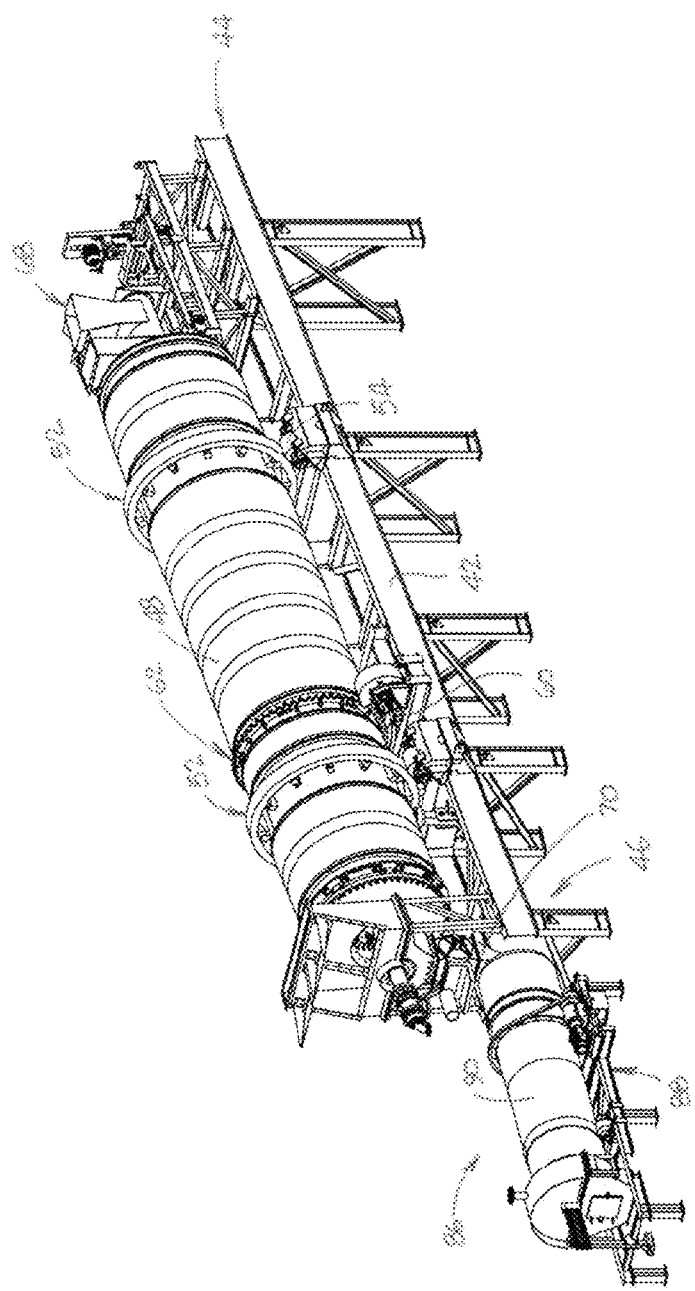
FIG. 7 is a perspective view of the preferred drying and cooling assemblies of the plant illustrated in FIG. 1.
Figure 8:
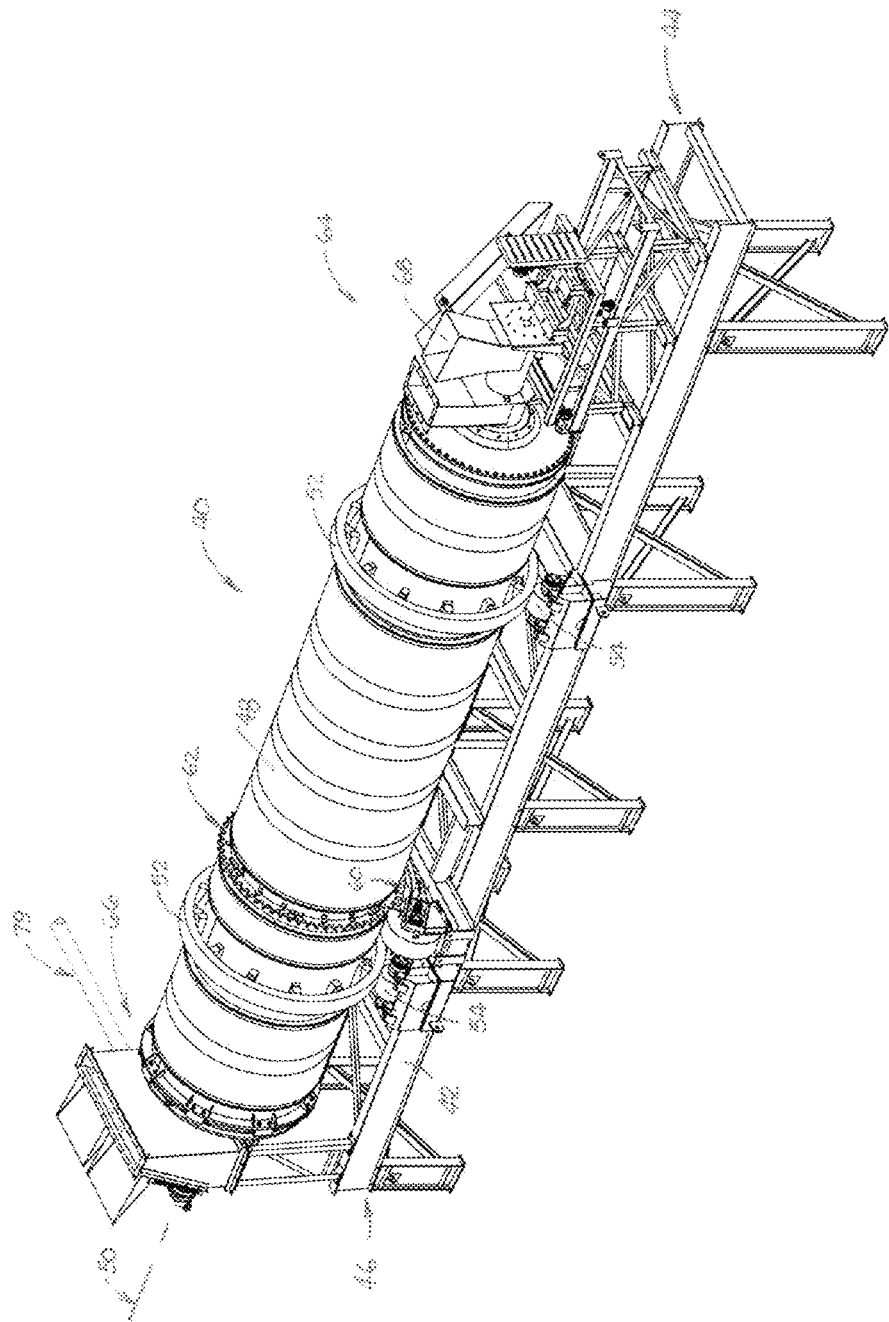
FIG. 8 is an alternate perspective view of the preferred drying assembly of the plant illustrated in FIG. 1.

The assembly for processing biomass material also includes cooling assembly 86 that is preferably located immediately downstream of drying assembly 40, as shown in FIGS. 1, 4 and 7. Cooling assembly 86 includes cooler frame 88 and generally cylindrical cooling drum 90. The cooling drum is mounted on the cooler frame for rotation about axis 92 (shown in FIG. 18). Preferred cooling drum 90 includes a pair of bearing rings 94 that engage trunnions 96 on cooler frame 88. Motor 98 (shown in FIGS. 17 and 18) is adapted to rotatably drive sprocket 100 that is in driving engagement with drive chain 102 which engages sprocket 104 mounted on the outer surface of the drum to rotate cooling drum 90. Alternative drive systems such as are known to those having ordinary skill in the art to which the invention relates may also be employed to rotate cooling drum 90 with respect to cooler frame 88.

Figure 19:
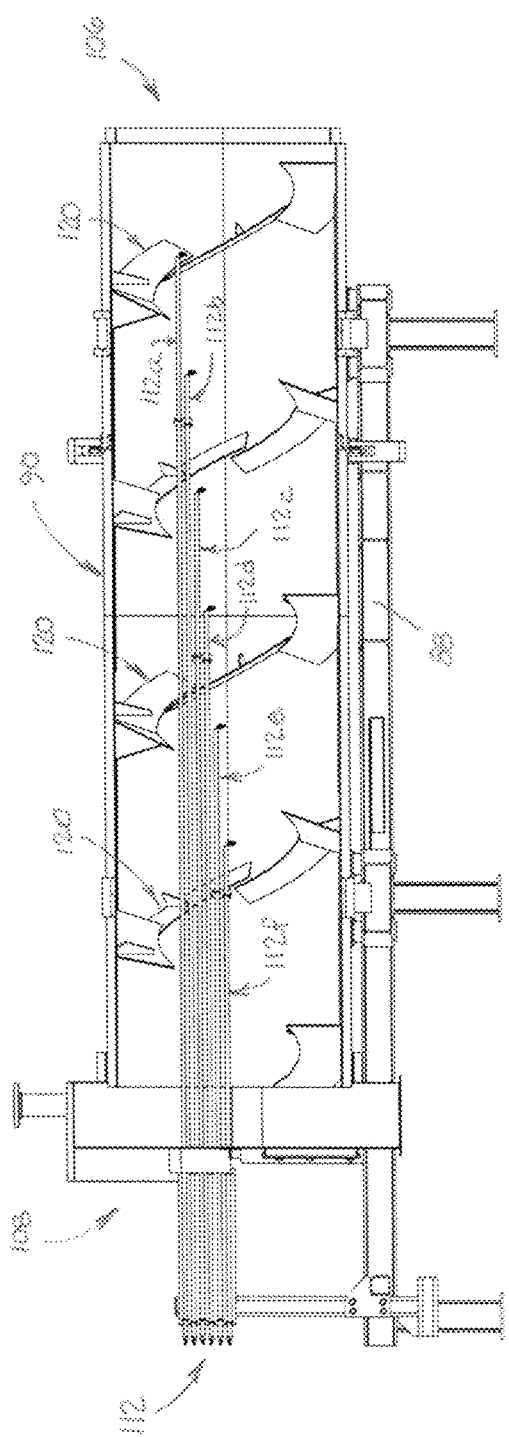
FIG. 19 is a partial sectional view of the preferred cooling assembly of FIGS. 17 and 18.

Cooling drum 90 has inlet end 106 with an inlet opening (best shown in FIG. 17) for introduction of dried biomass material that has been discharged from dryer drum 48 through chute 70. The cooling drum also has outlet end 108 with a discharge outlet 110. Preferably, a plurality of cooling tubes 112 extend along the interior of the cooling drum from the outlet end towards the inlet end, as shown in FIG. 19. In the embodiment of the cooling assembly shown in the drawings, six cooling tubes 112 are provided, although any convenient number of cooling tubes could be employed. Preferably, as shown in FIG. 19, each cooling tube 112 has a length that is different from that of each of the other cooling tubes. Thus, cooling tube 112a is longer than all of the other cooling tubes, cooling tube 112b is longer than cooling tubes 112c, 112d, 112e and 112f, cooling tube 112c is longer than cooling tubes 112d, 112e and 112f, cooling tube 112d is longer than cooling tubes 112e and 112f, and cooling tube 112e is longer than cooling tube 112f. Preferably, the end of cooling tube 112a is located approximately 10% of the length of the cooling drum from the inlet end, and the end of cooling tube 112b is located approximately 10% of the length, of the cooling drum from the end of cooling tube 112a. Similarly, the end of cooling tube 112c is located approximately 10% of the length of the cooling drum from the end of cooling tube 112b, and the end of cooling tube 112d is located approximately 10% of the length of the cooling drum from the end of cooling tube 112c. In the same manner, the end of cooling tube 112e is located approximately 10% of the length of the cooling drum from the end of cooling tube 112d, and the end of cooling tube 112f is located approximately 10% of the length of the cooling drum from the end of cooling tube 112e. In the preferred embodiment of the invention illustrated in the drawings, each of the five cooling tubes other than the longest one is shorter by approximately 10% of the length of the cooling drum than the next longest cooling tube.

Figure 17:
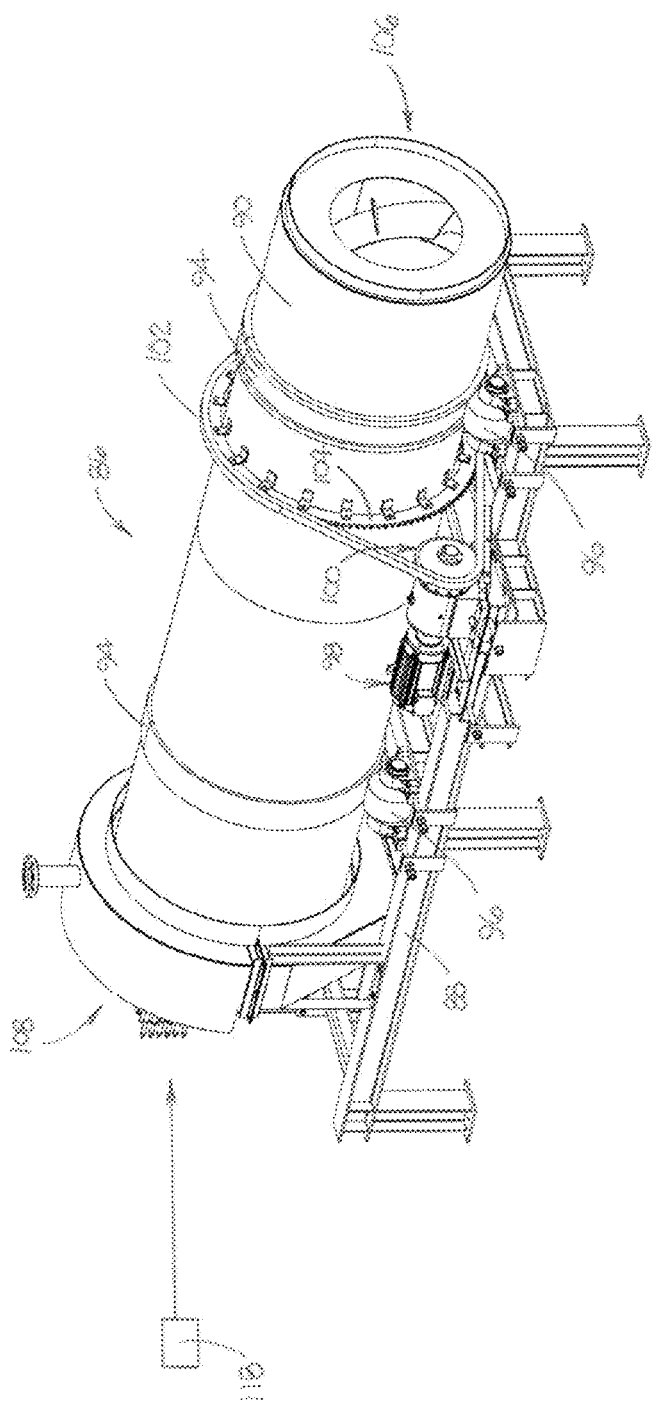
FIG. 17 is a perspective view of the preferred cooling assembly of the plant illustrated in FIG. 1.
Figure 18:
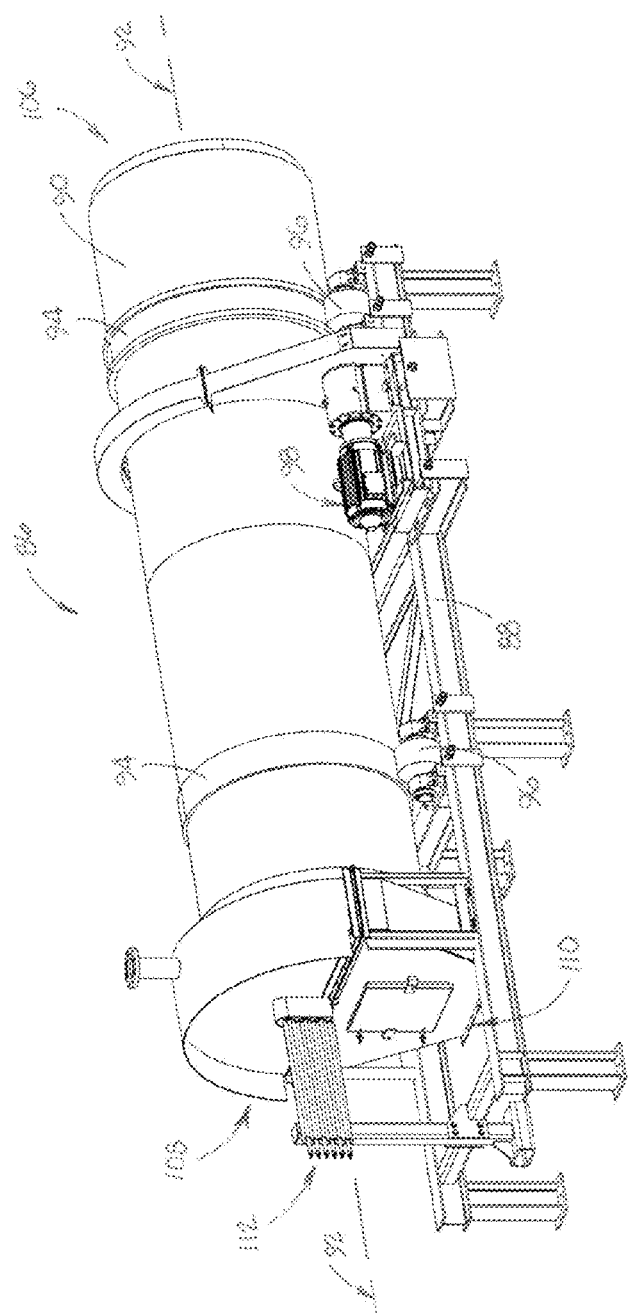
FIG. 18 is an alternate perspective view of the preferred cooling assembly of FIG. 17.
Figure 20:
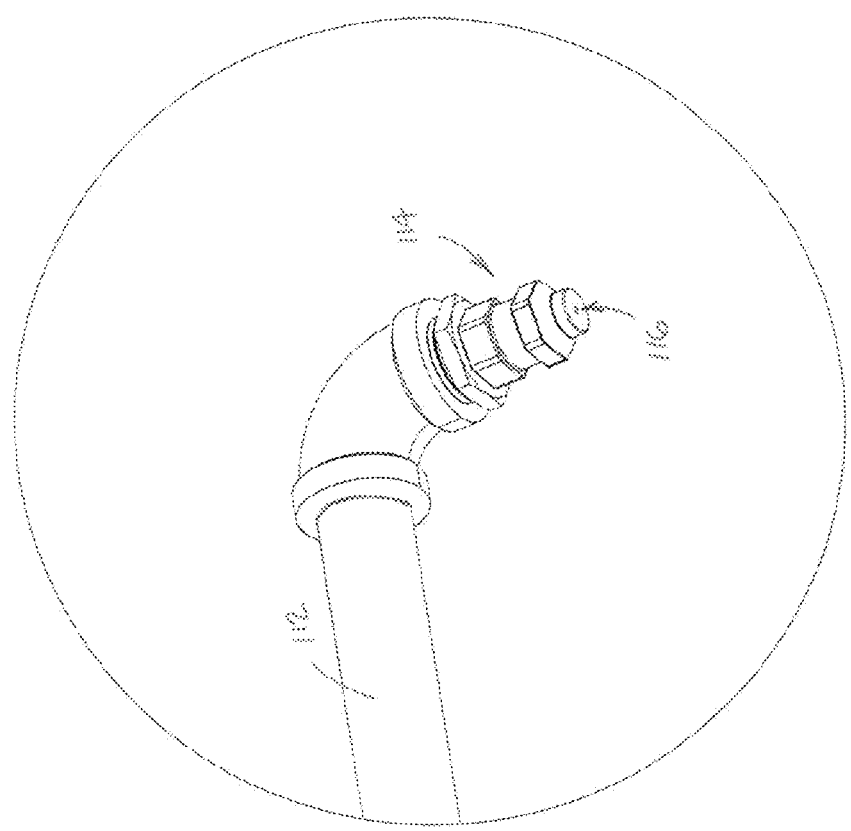
FIG. 20 is a detailed view of a nozzle of the preferred cooling assembly of the plant illustrated in FIG. 1.

Each cooling tube has a nozzle 114 (best, shown in FIG. 20) that is mounted on the end of the cooling tube within the cooling dram, although multiple nozzles may be mounted along the length of each cooling tube. Preferably, each nozzle has a nozzle opening 116 that is configured and arranged to discharge cooling fluid downwardly from the cooling tube, most preferably at an angle of about 90° to the plane of the dynamic angle of repose of the biomass material in cooling drum 90. Because the preferred arrangement of cooling tubes and nozzles within cooling drum 90 spaces the nozzles along the length of the cooling drum, cooling fluid may be dispensed through the nozzles onto biomass material located throughout the drum. A pump 118, shown schematically in FIG. 17, provides the means for conveying cooling fluid, such as water, through each of the cooling tubes to be discharged through the nozzles. A plurality of flights 120 are mounted on the interior of the cooling drum and arranged to direct material from inlet end 106 to outlet end 108 as the cooling drum, is rotated. Preferably, cooling water is discharged from the nozzles of the cooling tubes onto die dried biomass in the cooling drum in quantities sufficient to reduce the temperature of the dried biomass material without adding additional moisture to the biomass. Furthermore, it is preferred that the cooling fluid be discharged on the biomass material in the cooling drum while drum 90 is rotated at a rate so as to reduce the temperature of the biomass material at the discharge outlet to a temperature that is less than about 150° F., and more preferably to a temperature that is less than about 130° F.

In operating the assembly to process green biomass material for pelletizing into a fuel pellet, pellet press 122 is provided. Preferably, a reciprocating pellet press such as the Pellet Pro-4 pelletizer that is sold by Breaker Technology, Inc. of Thornbury, Ontario, Canada is employed as the pellet press.

In order to process green biomass according to the invention, the green biomass (or pre-dried biomass) is introduced into inlet 68 at upper end 64 of dryer drum 48. If it is desired to produce white biomass, burner 22 is operated to heat thermal fluid in heat exchanger 26 to a temperature of at least about 200° F. This heated thermal fluid is conveyed from heat exchanger 26 through thermal fluid tubes 72 in drum dryer 48, and the drum dryer is rotated at a rate sufficient to convey the green biomass (or pre-dried biomass) introduced into the inlet thereof to the discharge outlet of the dryer drum as the biomass material is heated to a temperature of at least about 200° F. so as to convert the green biomass into white biomass.

If, on the other hand, it is desired to produce torrefied biomass, burner 22 is operated to heat thermal fluid in the heat exchanger to a temperature within the range of about 475° F. to about 550° F., and this heated thermal fluid is conveyed from heat exchanger 26 through thermal fluid tubes 72 in drum dryer 48. The drum dryer is rotated at a rate sufficient to convey the green biomass (or pre-dried biomass) introduced into, the inlet thereof to the discharge outlet of tire dryer drum as the biomass material is heated to a temperature of at least about 475° F. so as to convert the green biomass into torrefied biomass.

The white biomass or torrefied biomass is conveyed from the discharge outlet of the dryer drum to the inlet of the cooling drum, and cooling fluid is conveyed through the cooling tube of the cooling drum so that it is discharged through the nozzle of the cooling drum onto the white biomass or torrefied biomass therein, while the cooling drum is rotated at a rate sufficient to convey the white biomass or torrefied biomass introduced into the inlet thereof to the discharge outlet of the cooling drum as it is cooled to a temperature that is less than about 150° F., and preferably to a temperature of less than about 130° F. The white biomass or the torrefied biomass, as the case may be, is conveyed to the pellet press by conveyor or other means, and the pellet press is operated to compress the white biomass or the torrefied biomass to produce fuel pellets.

The inventors have discovered that by: (a) drying green wood or other biomass materials, (b) subjecting the dried materials to continued heating for torrefaction, (e) optionally cooling the torrefied biomass to near ambient temperature, and (d) compressing the torrefied biomass in a heated pelletizing die until a desired target internal temperature is obtained in the pellets (or heating the torrefied biomass to a desired temperature prior to compressing it in an un-heated pelletizing die), the resulting pellets will have all of the desired properties. Furthermore, the resulting pellets will be generally water-resistant and will not disintegrate if they get wet.

Preferably, the heating of the dried biomass materials in the drying assembly is carried out in a low-oxygen environment, although as described herein, the process may be begun under standard atmospheric conditions. Generally, the heating process may begin at a temperature well below the final process temperature, including at ambient temperatures. It is believed that a final temperature of at least about 475° F. must be reached in the dried biomass to produce the desired properties of torrefaction. The time required time to reach the desired temperature and to hold the biomass materials at this temperature until the desired properties are produced can vary considerably, depending on the type of green biomass materials and whether a predryer is used. The temperature range in which the desired effects are produced by torrefaction of the dried biomass material has been found to be about 475° F. to 500° F. for one particular type of hardwood material. Other temperature ranges may necessary for other wood species or other types of biomass materials. Furthermore, after the torrefied hardwood material has been cooled to ambient temperature, the inventors have found that pelletizing the material at a pressure of about 10,000 psi in a die heated to a temperature within the range of about 500° F. to about 530° F., preferably about 520° F., for a period of at least about one second will allow the resulting pellets to reach the target internal temperature. Pellets produced by this method are more economical than pellets produced by conventional processes because no additives are required in the process. Lignin, which remains in the biomass after the torrefaction process, is activated by the heat of the pellet press to serve as a natural binder that holds the pellets together.

Although this description contains many specifics, these should not be construed as limiting the scope of the invention, but as merely providing illustrations of the presently preferred embodiment thereof, as well as the best mode contemplated by the inventors of carrying out the invention. The invention, as described herein, is susceptible to various modifications and adaptations, as would be understood by those having ordinary skill in the art to which the invention relates, and the same are intended to be comprehended within the meaning and range of equivalents of the appended claims.

What is claimed is:

1. A method for making a fuel pellet from biomass, said method comprising:
    (A) providing a heating assembly comprising:
        (1) a burner;
        (2) a heat exchanger having a plurality of heat transfer coils therein;
        (3) a combustion chamber that is operatively connected between the burner and the heat exchanger so that the burner may be operated to heat a thermal fluid in the heat transfer coils to a temperature within the range of 200° F. to 550° F.;
    (B) providing a drying assembly comprising:
        (1) a dryer frame having:
            (a) an upper end;
            (b) a lower end;
        (2) a generally cylindrical dryer drum that is mounted on the dryer frame for rotation about the axis of the dryer drum, said dryer drum having:
            (a) an upper end having an inlet;
            (b) a lower end having a discharge outlet;
            (c) a plurality of thermal fluid tubes extending along the interior thereof;
        (3) means for rotating the dryer drum with respect to the dryer frame;
        (4) means for conveying the thermal fluid from the heat exchanger of the heating assembly through the thermal fluid tubes in the dryer drum;
    (C) providing a cooling assembly comprising:
        (1) a cooler frame;
        (2) a generally cylindrical cooling drum that is mounted on the cooler frame for rotation about the axis of the cooling drum, said cooling drum having:
            (a) an inlet end having an inlet;
            (b) an outlet end having a discharge outlet;
            (c) a cooling tube extending along the interior thereof;
            (d) a nozzle mounted on the cooling tube so as to discharge cooling fluid into the interior of the cooling drum;
            (e) a plurality of flights mounted on the interior of the cooling drum and arranged to direct material from the inlet end to the outlet end as the cooling drum is rotated;
        (3) means for rotating the cooling drum with respect to the cooler frame;
        (4) means for conveying cooling fluid through the cooling tube;
    (D) providing a steam duct for conveying steam from the upper end of dryer drum to the combustion chamber;
    (E) providing a VOC duct for conveying volatile organic compounds from the lower end of the dryer drum to the combustion chamber;
    (F) providing a pellet press for compressing white biomass or torrefied biomass;
    (G) introducing green biomass into the inlet at the upper end of the dryer drum;
    (H) operating the burner to heat thermal fluid in the heat exchanger, without causing such thermal fluid to undergo a change of phase, to a temperature of at least about 200° F. if it is desired to produce white biomass, or operating the burner to heat thermal fluid in the heat exchanger, without causing such thermal fluid to undergo a change of phase, to a temperature within the range of about 475° F. to about 550° F. if it is desired to produce torrefied biomass;
    (I) conveying heated thermal fluid from the heat exchanger through the thermal fluid tubes in the drum dryer;
    (J) rotating the drum dryer at a rate sufficient to convey the green biomass introduced into the inlet thereof to the discharge outlet of the dryer drum as it is heated to a temperature of at least about 200° F. so as to convert the green biomass into white biomass, or rotating the dryer drum at a rate sufficient to convey the green biomass introduced into the inlet thereof to the discharge outlet of the dryer drum as it is heated to a temperature of at least about 475° F. so as to convert the green biomass into torrefied biomass;
    (K) conveying the white biomass or torrefied biomass from the discharge outlet of the dryer drum to the inlet of the cooling drum;
    (L) conveying cooling fluid through the cooling tube of the cooling drum so that it is discharged through the nozzle of the cooling drum onto the white biomass or torrefied biomass therein;
    (M) rotating the cooling drum at a rate sufficient to convey the white biomass or torrefied biomass introduced into the inlet thereof to the discharge outlet of the cooling drum as it is cooled to a temperature that is less than about 150° F.;
    (N) conveying the white biomass or the torrefied biomass to the pellet press;
    (O) operating the pellet press to compress the white biomass or the torrefied biomass to produce fuel pellets.

2. The method of claim 1 which includes operating the pellet press to compress the white biomass material or the torrefied biomass material at a pressure of about 10,000 psi in a die heated to a temperature within the range of about 500° F. to about 530° F. for a period of at least about one second.

3. The method of claim 1 which includes the step of rotating the cooling drum at a rate sufficient to convey the white biomass or torrefied biomass introduced into the inlet thereof to the discharge outlet of the cooling drum as it is cooled to a temperature that is less than about 130° F.

4. The method of claim 1 which includes:
    (A) providing a recirculation system to recirculate gases from the exhaust of the heat exchanger to the dryer drum, said recirculation system comprising:
        (1) an outlet line from the heat exchanger;
        (2) an inlet line to the dryer drum; and
        (3) a recirculating fan that is in fluid communication with the outlet line from the heat exchanger and the inlet line to the dryer drum;
    (B) operating the recirculating fan to draw gases from the exhaust of the heat exchanger and transport said gases to the dryer drum.

5. The method of claim 1 which includes:
    (A) providing a predryer for heating green biomass material, said predryer comprising:
        (1) an inclined rotating predryer drum, said drum having:
            (a) an upper end;

(b) a lower end;
(c) a long axis;
(d) a rotation system for rotating the predryer drum about its long axis;
(2) an inlet chute for green biomass material located at the upper end of the predryer drum;
(3) a gas inlet line for exhaust gases from the heat exchanger located at the upper end of the predryer drum, so that hot flue gases from the heat exchanger are directed into the predryer drum so as to flow therethrough parallel to the flow of biomass;
(4) an outlet for pre-dried biomass located at the lower end of the predryer drum;
(5) a conveyor located at the lower end of the predryer drum for transporting pre-dried biomass to the dryer drum;
(B) operating the rotation system to rotate the predryer drum about its long axis;
(C) introducing green biomass material into the inlet chute of the predryer drum;
(D) directing hot flue gases from the heat exchanger into the gas inlet line to predryer drum so as to flow therethrough parallel to the flow of biomass therein;
(E) discharging pre-dried biomass from the outlet of the predryer drum.

6. The method of claim 5 which includes:
(A) conveying the pre-dried biomass from the outlet of the predryer drum to the inlet of the drum dryer;
(B) rotating the drum dryer at a rate sufficient to convey the pre-dried biomass introduced into the inlet thereof to the discharge outlet of the dryer drum as it is heated to a temperature sufficient to convert the pre-dried biomass into torrefied biomass having a heating value within the range of about 8900 BTU/lb to about 9500 BTU/lb.

7. The method of claim 1:
(A) which includes providing an external fuel supply to the burner;
(B) which includes means for controlling the supply of external fuel to the burner;
(C) supplying external fuel to the burner at a first rate;
(D) adjusting the rate of supply of external fuel to the burner to a second rate that is lower than the first rate, as volatile organic compounds obtained from heating the green biomass in the dryer drum are conveyed from the lower end of the dryer drum to the combustion chamber.

* * * * *